United States Patent
Floro

(10) Patent No.: US 11,098,912 B1
(45) Date of Patent: Aug. 24, 2021

(54) SYSTEM AND METHOD FOR ENERGY USE CONTROL IN AN ENVIRONMENTAL CONTROL SYSTEM

(71) Applicant: GoldCore Design Systems, LLC, Willoughby, OH (US)

(72) Inventor: William E. Floro, Willoughby, OH (US)

(73) Assignee: GoldCore Design Systems, LLC, Willoughby, OH (US)

(*) Notice: Subject to any disclaimer, the term of this patent is extended or adjusted under 35 U.S.C. 154(b) by 353 days.

(21) Appl. No.: 15/894,543

(22) Filed: Feb. 12, 2018

Related U.S. Application Data

(63) Continuation of application No. 15/627,589, filed on Jun. 20, 2017, now Pat. No. 10,852,018.

(60) Provisional application No. 61/352,676, filed on Jun. 21, 2016.

(51) Int. Cl.
| | |
|---|---|
| F24F 11/30 | (2018.01) |
| G05B 15/02 | (2006.01) |
| G06F 3/0484 | (2013.01) |
| F24F 110/10 | (2018.01) |
| F24F 11/63 | (2018.01) |

(52) U.S. Cl.
CPC .............. *F24F 11/30* (2018.01); *G05B 15/02* (2013.01); *G06F 3/04847* (2013.01); *F24F 11/63* (2018.01); *F24F 2110/10* (2018.01)

(58) Field of Classification Search
CPC .......... F24F 11/30; F24F 11/63; G05B 15/02; G06F 3/04847
See application file for complete search history.

(56) References Cited

U.S. PATENT DOCUMENTS

| | | | |
|---|---|---|---|
| 4,997,029 A | 3/1991 | Otsuka et al. | |
| 6,581,846 B1* | 6/2003 | Rosen | G05D 23/1902 236/46 R |
| 6,685,098 B2* | 2/2004 | Okano | G04G 15/006 236/47 |
| 6,868,293 B1* | 3/2005 | Schurr | F24D 10/00 700/22 |
| 7,188,779 B2* | 3/2007 | Alles | F24F 3/0442 165/205 |
| 8,239,066 B2* | 8/2012 | Jennings | G06F 1/3231 700/276 |
| 8,768,521 B2* | 7/2014 | Amundson | G05B 15/02 700/276 |
| 9,154,001 B2* | 10/2015 | Dharwada | H02J 13/00001 |

(Continued)

*Primary Examiner* — Andrea N Long
(74) *Attorney, Agent, or Firm* — Lorenz & Kopf, LLP

(57) ABSTRACT

Provided is a method in a control system that is configured to provide command information to environmental adjustment equipment. The control system includes a plurality of user interface devices wherein each user interface device is configured to select an operating mode for a plurality of monitored areas in a building and wherein each user interface device is located in a different one of the monitored areas. The method comprises detecting a mode change request at a first user interface device for a first monitored area and executing the mode change request for the first monitored area while retaining a prior selected mode for another monitored area that was selected using a different user interface device when for each monitored area the environmental adjustment equipment includes a throttling device for controlling the flow of conditioned medium provided to the monitored area.

9 Claims, 11 Drawing Sheets

(56) References Cited

U.S. PATENT DOCUMENTS

| | | | |
|---|---|---|---|
| 9,453,655 B2* | 9/2016 | Bruck | F24F 11/30 |
| 9,500,379 B2* | 11/2016 | Schnell | F24F 3/14 |
| 9,940,801 B2* | 4/2018 | Phillips | H04L 67/12 |
| 2002/0005435 A1* | 1/2002 | Cottrell | G05D 23/1904 |
| | | | 236/46 R |
| 2004/0262410 A1* | 12/2004 | Hull | G05D 23/1904 |
| | | | 236/91 R |
| 2005/0040943 A1 | 2/2005 | Winick | |
| 2005/0119766 A1* | 6/2005 | Amundson | F24F 11/62 |
| | | | 700/17 |
| 2005/0270151 A1 | 12/2005 | Winick | |
| 2006/0192021 A1* | 8/2006 | Schultz | F24F 11/30 |
| | | | 236/1 C |
| 2007/0220907 A1* | 9/2007 | Ehlers | H02J 3/14 |
| | | | 62/126 |
| 2010/0106305 A1* | 4/2010 | Pavlak | F24F 11/30 |
| | | | 700/276 |
| 2011/0257795 A1* | 10/2011 | Narayanamurthy | F24F 5/0046 |
| | | | 700/277 |
| 2012/0024969 A1* | 2/2012 | Kates | F24F 11/0001 |
| | | | 236/49.3 |
| 2012/0067560 A1* | 3/2012 | Bergman | F24F 11/30 |
| | | | 165/238 |
| 2012/0123594 A1* | 5/2012 | Finch | G05D 23/1923 |
| | | | 700/278 |
| 2013/0151016 A1* | 6/2013 | Bias | F24F 11/30 |
| | | | 700/276 |
| 2013/0178986 A1* | 7/2013 | Lombard | G05D 23/1904 |
| | | | 700/276 |
| 2013/0332306 A1* | 12/2013 | Fahmy | G06Q 30/0282 |
| | | | 705/26.7 |
| 2013/0340993 A1* | 12/2013 | Siddaramanna | F24F 11/89 |
| | | | 165/200 |
| 2014/0005837 A1* | 1/2014 | Fadell | F24F 11/0012 |
| | | | 700/276 |
| 2014/0041846 A1* | 2/2014 | Leen | F24F 11/30 |
| | | | 165/208 |
| 2014/0207291 A1* | 7/2014 | Golden | F24F 11/30 |
| | | | 700/277 |
| 2016/0062332 A1* | 3/2016 | Call | F24F 11/83 |
| | | | 700/276 |
| 2016/0209071 A1* | 7/2016 | Golden | H04L 12/2809 |
| 2018/0314219 A1* | 11/2018 | Gamroth | G06F 1/26 |

\* cited by examiner

US 11,098,912 B1

SYSTEM AND METHOD FOR ENERGY USE CONTROL IN AN ENVIRONMENTAL CONTROL SYSTEM

CROSS-REFERENCE TO RELATED APPLICATION

This application claims the benefit as a continuation of U.S. patent application Ser. No. 15/627,589, having the same title as this application, and filed on Jun. 20, 2017, which in turn claims the benefit of U.S. Provisional Application No. 62/352,676 filed Jun. 21, 2016. This application incorporates each of these prior applications into the present application by reference.

TECHNICAL FIELD

The technology described in this patent document relates generally to environmental adjustment equipment such as HVAC systems and more particularly to controls for environmental adjustment equipment.

BACKGROUND

Heating, ventilation and air conditioning (HVAC) systems can provide thermal comfort and acceptable indoor air quality for a building such as a single-family home, apartment building, hotel, senior living facility, an industrial or office building, a skyscraper, a hospital, an onboard vessel, and others. Control systems for HVAC systems can affect the energy usage of the HVAC system.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
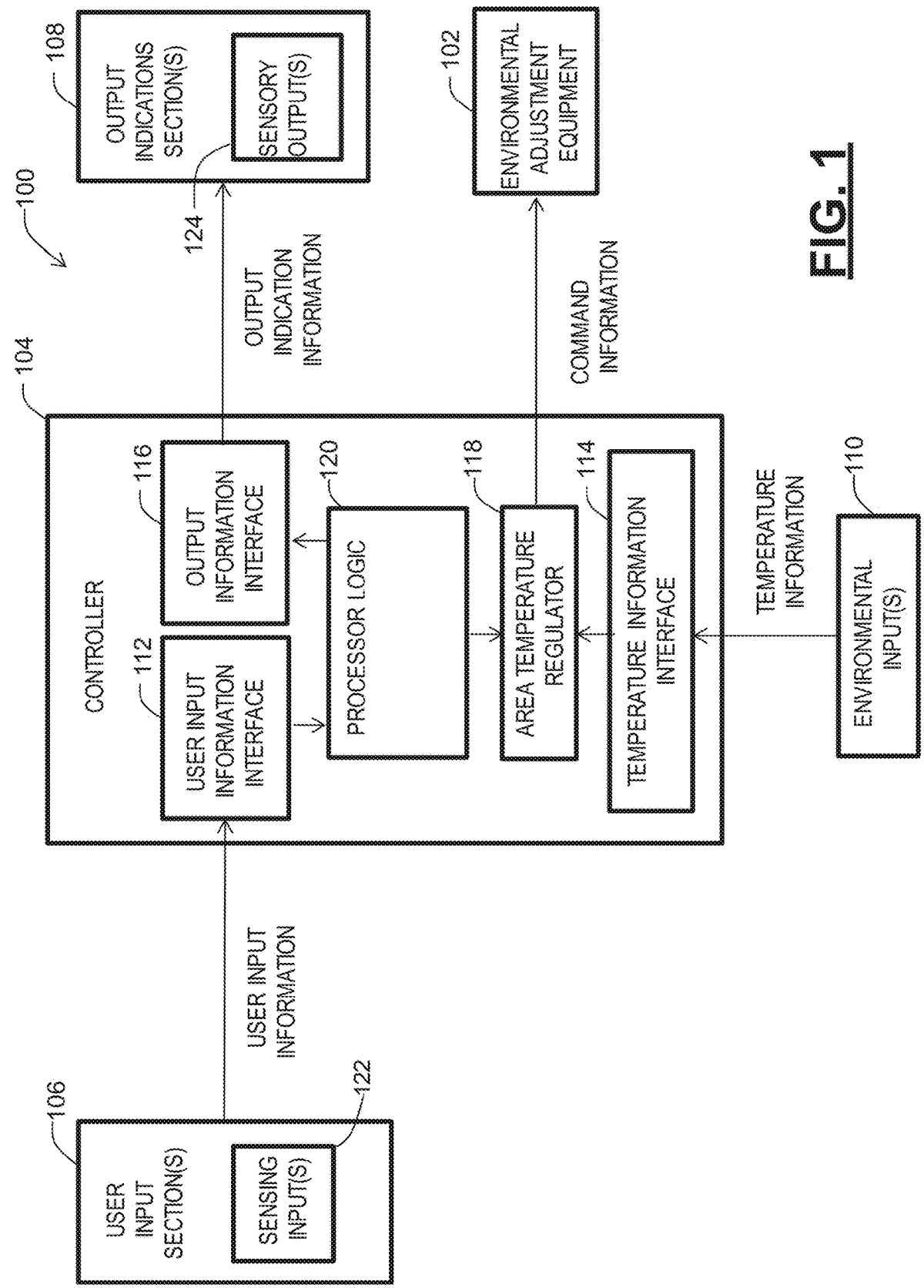
FIG. 1 is a block diagram depicting an example control system for controlling environmental adjustment equipment, in accordance with some embodiments.

FIG. 1 is a block diagram depicting an example control system 100 for controlling environmental adjustment equipment 102. The example environmental adjustment equipment 102 may include a heating, ventilating, and/or air conditioning (HVAC) system, a heat pump, or some other type of system for affecting the thermal comfort and/or air quality inside of a building such as a home or commercial building. The example control system 100 includes a controller 104, a user input section 106, an output indication section 108, and an environmental input device 110.

The example controller 104 includes an input interface 112 configured to receive user input information such as desired operating parameters for the environmental adjustment equipment 102 from the user input section 106 and an environmental input interface 114 (e.g., a temperature information interface 114) for receiving environmental information (e.g., temperature information) from one or more areas in a building having one or more environmental input devices (e.g., a temperature sensing device) for measuring environmental conditions (e.g., the temperature) in a monitored area. The example controller 104 also includes an output information interface 116 configured to provide output indication information regarding operating parameters for the environmental adjustment equipment 102 to the output indication section 108 for display, for example, for a user, and an area environmental regulator 118 (e.g., an area temperature regulator 118) for providing command information (e.g., HVAC command information) to the environmental adjustment equipment 102 to control the operation of the environmental adjustment equipment 102.

The example controller 104 further includes processor logic 120. The example processor logic 120 may include a digital central processing unit (CPU) in communication with non-transient computer readable media. The CPU may be configured to execute programming instructions stored as a computer program in the non-transient computer readable media, and send and receive signals to/from the input interface 112, the environmental input interface 114, the output interface 116, and the area environmental regulator 118. The computer readable media may include various storage types including optical storage, magnetic storage, solid state storage, other non-volatile memory, flash memory, an ASIC, a CD, or others. The computer program may embody the methods disclosed herein, allowing the CPU to carryout out the methods and control the environmental adjustment equipment 102.

Instead of a CPU, the control system 100 may have a different type of processor to provide the processor logic, e.g. an embedded controller, discrete components and circuits, microprocessors and support circuitry, or any processing module that might be deployable.

The example processor logic 120 may be configured, for example, by programming instructions to receive and process user input information from the user input section 106 and environmental input information using one or more environmental input device(s) 110 and generate and provide output indication information to the output indication section 108 using the output information interface 116 and HVAC command information to the environmental adjustment equipment 102 using the area environmental regulator 118.

The example user input section 106 may be incorporated in a control panel, at a fixed location in a building, and/or implemented via a handheld computing device (e.g., a phone, tablet, or laptop). The example user input section 106 includes sensing inputs 122 (e.g., switches, touch sensors, finger/body proximity detector, buttons, etc.) for sensing (i.e., receiving) user input. Herein, the term "switch", when used in context of an input that can be actuated by a user, for example, can also represent various other types of sensing inputs such as one or more (e.g., capacitive type) touch sensor(s), proximity detector(s), light detectors, sound detectors, etc. since those other types of sensing inputs can also be actuated by a user applying the type of actuating stimulus appropriate for the sensing input, e.g., a touch gesture for a touch sensor, light for a light sensor, a finger or human body close enough to a proximity detector to be detected, etc.

The example output indication section 108 may be incorporated in a control panel (with or without the user input section 106), at a fixed location in a building, and/or implemented via a handheld computing device. The example output indication section 108 includes one or more sensor outputs 124 (e.g., display panels, LEDs, speakers, etc.) for providing output indication information to a user in a manner that allows the user to comprehend the information.

The example environmental input devices 110 may be located at different monitored areas within a building to which the environmental adjustment equipment 102 may provide conditioned medium (e.g., heating and/or cooling). The example environmental input device 110 may include, for example, one or more thermocouples and/or other discrete temperature sensors and associated circuits, thermostats, devices containing thermostats and/or discrete temperature sensors, and/or outputs from more complex units or devices that measure ambient temperature.

Based on requests and/or determined needs for conditioned medium, the example area environmental regulator 118, for one or more monitored areas can issue HVAC command information (e.g., requests to apply or remove heating or cooling) to the environmental adjustment equipment 102 to perform indoor environmental condition control, for example, by regulating the temperature of one or more areas in the home or building. The example environmental adjustment equipment 102 may include one or more HVAC devices such as a heater, a cooling unit, a blower, an air duct damper, a hot water valve, and others utilized for indoor environmental temperature control and may also include devices such as humidifiers, dehumidifiers, air cleaners, and others, and/or one or more intermediate components such as software modules or other types of control modules that operate heating or cooling devices.

The directional arrows of FIG. 1, and other FIGS. herein, illustrate coupling between the various functional blocks and indicate the primary direction of information flow but do not limit signal, data, and/or information flow between any blocks or in any particular direction.

Figure 2:
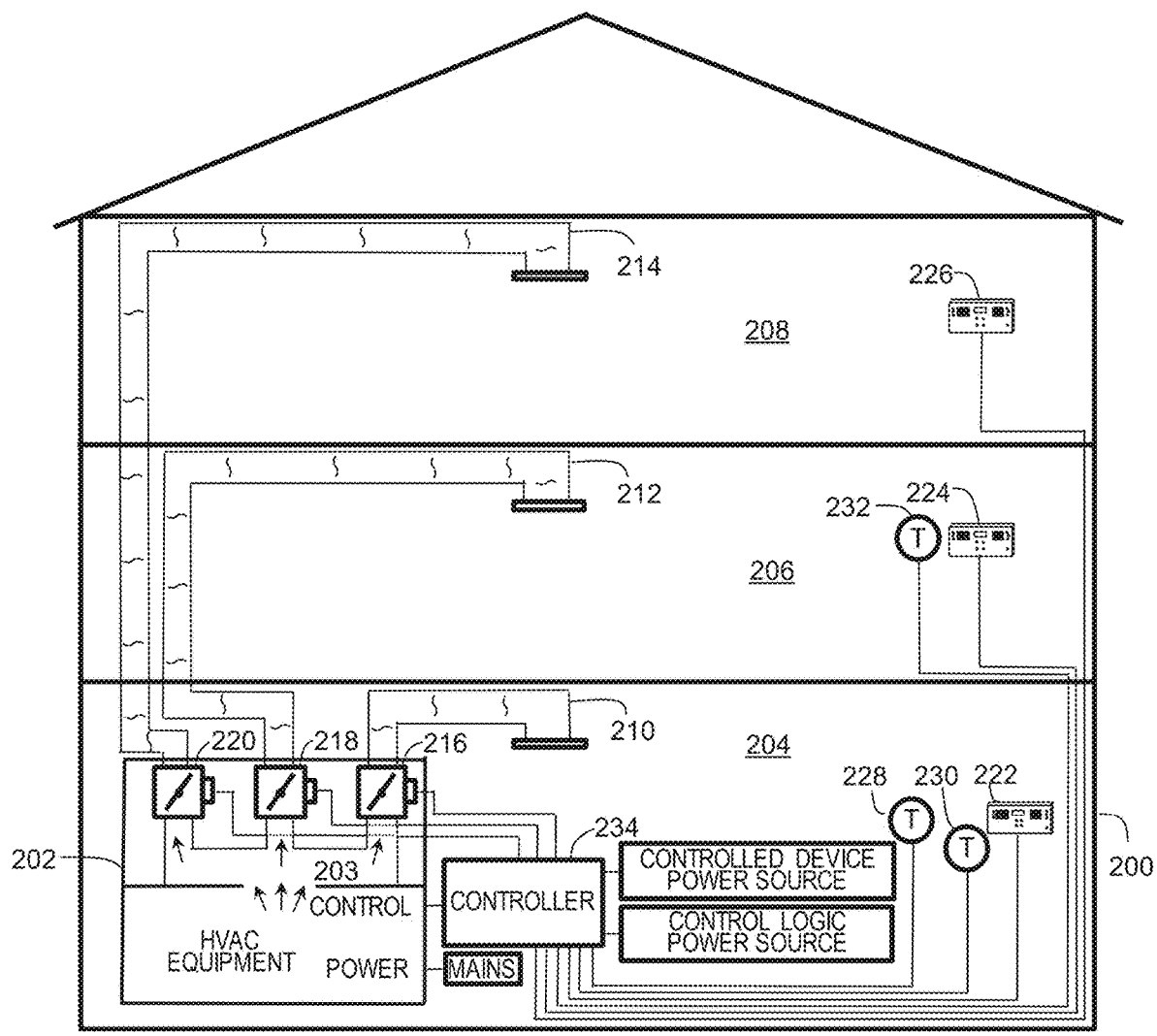
FIG. 2 is a diagram of an example building depicting example environmental adjustment equipment and an example control system employed to control the example environmental adjustment equipment to control the temperature and energy usage of multiple areas in the building, in accordance with some embodiments.

FIG. 2 is a diagram of an example building 200 depicting example environmental adjustment equipment and an example control system employed to control the example environmental adjustment equipment to control the temperature and energy usage of multiple areas in the building 200. The example environmental adjustment equipment includes HVAC equipment 202 that provide conditioned medium 203 (e.g., heating or cooling) to three monitored areas 204, 206, 208 via the ducts 210, 212, 214. The example environmental adjustment equipment also includes throttling devices (e.g., air duct damper dampers 216, 218, 220) for controlling the flow of the conditioned medium 203 to the three monitored areas 204, 206, 208 via the ducts 210, 212, 214.

The example control system includes a control panel 222 in a first monitored area 204, a control panel 224 in a second monitored area 206, and a control panel 226 in a third monitored area 208. Each of the example control panels 222, 224, 226 includes a user input section for sensing user input for the control system and an output indication section for the control system. The example control system also includes thermostats 228 and 230 in the first monitored area 204 and thermostat 232 in the second monitored area 206. Each of the example control panels 222, 224, 226 may also include a temperature sensing device such as a thermostat. By using separate thermostats or temperature sensing devices incorporated into the example control panels 222, 224, 226, each monitored area 204, 206, 208 has a temperature sensing device. The example control system also includes an example controller 234 configured to receive and process user input information from the user input sections of the control panels 222, 224, 226. The example controller 234 is also configured to receive and process environmental input information from the separate thermostats 228, 230, 232 and/or temperature sensing devices incorporated into the example control panels 222, 224, 226. The example controller 234 is further configured to generate and provide output indication information to the output indication sections of the example control panels 222, 224, 226. Additionally, the example controller 234 is configured to provide command information to control the HVAC equipment 202 and the dampers 216, 218, 220.

In the illustrated example, the example control panels 222, 224, 226 are shown as separate from the example controller 234. In other examples, the controller may be integrated into one, some, or all control panels. In the illustrated example, the example control panels 222, 224, 226 are shown as having a wired connection with the example controller 234. In other examples, the example control panels 222, 224, 226 may have a wireless connection with each other and/or the example controller 234. Similarly, the example thermostats 228, 230, 232 are shown as having a wired connection with the example controller 234. In other examples, the example thermostats 228, 230, 232 may have a wireless connection with the example controller 234, each other, and/or the example control panels 222, 224, 226. In another example, one control panel could include a controller such as the control panel closest to the environmental adjustment equipment, and other control panels communicate with the control panel having the controller, for example, by wireless communications. In another example, a control system may include a single control panel for the entire building wherein the single control panel may or may not include an integrated controller.

The example control panels 222, 224, 226 may include processor logic. The example processor logic may include a CPU in communication with non-transient computer readable media. The CPU may be configured to execute programming instructions stored as a computer program in the non-transient computer readable media, and send and receive signals to/from the example thermostats 228, 230, 232, other control panels, the example controller 234, the HVAC equipment 202, and/or the dampers 216, 218, 220. The computer program may embody the methods disclosed herein, allowing the CPU to carryout the methods and control the environmental adjustment equipment. The example processor logic may also include an embedded controller, discrete components and circuits, microprocessors and support circuitry, or any processing module that might be deployable.

The environmental conditions (e.g., temperature) for each of three monitored areas 204, 206, 208 may be independently controlled by controlling the HVAC and the damper that regulates the flow of conditioned medium into the monitored area. In the illustrated example, each example control panel 222, 224, 226 in cooperation with the controller 234 can control the environmental conditions in the monitored area in which the control panel is located.

In another example, each control panel may be configured to control the environmental conditions in the monitored area in which the control panel is located and the environmental conditions in one or more additional monitored areas. In this scenario, the control panel may be configured with a separate user input section and a separate output indication section for each monitored area in which the control panel can control the environmental conditions, or alternatively, one user input section may contain all devices and logic needed to receive input information applicable to each of all of the monitored areas, and/or one output indications section could contain all devices and logic needed to provide output indications for each of all of the monitored areas. Alternatively, the control panel may be configured with a user input section and an output indication section that can be switched for use with each monitored area in which the control panel can control the environmental conditions.

In another example, the environmental conditions (e.g., temperature) for some but not all three monitored areas 204, 206, 208 may be independently controlled by controlling the HVAC and the damper that regulates the flow of conditioning media into the monitored area. In such a scenario, the environmental conditions for the monitored areas not having a damper that regulates the flow of conditioning media into the monitored area can be affected by the control of environmental conditions in other areas.

The example control system utilizes operating-mode-based temperature control to control the environmental adjustment equipment and to control the level of comfort, energy usage, energy savings, and energy cost savings for monitored areas in a building. Operating-mode-based temperature control may be implemented through the selection of an energy mode for activation. As an example, a maximum energy save mode, a mid-energy save mode, and a comfort mode may be the available options for the operating-mode-based temperature control. The maximum energy save mode may correspond to a lower set-point temperature when the conditioned medium is heating (a higher set-point temperature when the condition media is cooling). The mid-energy save mode may correspond to a middle set-point temperature when the conditioned medium is heating or cooling. The comfort mode may correspond to a higher set-point temperature when the conditioned medium is heating (a lower set-point temperature when the conditioned medium is cooling). The example control system can allow a user to control the environmental adjustment equipment by specifying an energy mode instead of specifying a particular temperature value. Although only three energy modes are discussed in this example, in other examples more than three energy modes may be available.

The example control system allows a user to select an operating (e.g., energy) mode for use during a timed period or an untimed period. Additionally, the example control system allows a user to select the operating mode for use during a timed period or an untimed period with the engagement of a single switch or predetermined actuation(s) of one or more sensing inputs (e.g., switches), such as might include a "confirm" or "done" switch actuation.

An "operating mode" (OM) selected to provide a range of regulated temperature for a particular "area" or "zone" in a system, can be considered a mode of operation that, when activated (selected and in use), causes signals and/or commands to be output for use by HVAC equipment (including throttling devices, if present, such as air duct dampers) in order to provide for the OM's associated area/zone, a temperature or range of temperature that results in an amount of energy usage per unit of time (e.g., hour) relative to that of one or more other OM(s) for the area when, instead, activated (in use) for the same area. The OM's "category" can be considered the amount of energy usage associated with the OM when in use and resulting in a range of regulated temperature for its associated area, relative to the energy usage of other OM(s) for the area when, instead, activated (in use).

The systems and products shown and/or described herein focus on aspects of energy usage, with goals of facilitating energy conservation, and therefore the categories of operating modes as shown and described are labeled and otherwise represented to enable the relative amounts of energy usage of two or more operating modes of dissimilar categories to be known or determined. The example terms "comfort", "max-save", and "mid-save" are chosen to represent their respective OM categories. The greatest usage of energy is associated with the comfort operating mode category. The max-save operating mode category infers more energy savings and energy cost savings than the other operating mode categories, and the mid-save operating mode category infers amounts of energy savings and energy cost savings in-between those of the other two categories.

Typically, the average area temperature resulting from an activated (in-use) OM of a particular category is different (i.e., higher or lower) than the average temperature resulting from an activated (in-use) OM of a differently labeled and/or otherwise represented category. The average temperature that can be expected for an area due to an activated (in-use) OM associated with it can be determined primarily by the set-point temperature(s) used while the OM is in the activated (in-use) state, in determining if and when conditioned medium should be delivered to the area.

Each OM has at least one associated set-point that is consistent with the category of the OM, that can be increased and decreased to a new value, and that can be selected (if more than one OM-associated set-points exist) to be the set point for use (e.g., by an area temperature regulator) in determining when the area of the set-point's associated OM should receive conditioned medium, during the time that the OM is in the activated (in-use) state.

The set-point temperature(s) used in regulating an area's temperature while an OM associated with it is in use (in the activated state), can be determined primarily by, or be selected primarily because of, both the OM's category and the current "seasonal mode", for example, heating or cooling. The "Time of Use" (TOU) of a set-point, i.e., is it for use during, or after a timed period (i.e., therefore, during an untimed period), can also contribute to the value created for a set-point and/or which set-point is selected for use for a particular OM. Some systems can presume that a set-point for use for an OM for a particular seasonal mode is the same set-point, or set-point value, used for both times of use. Some systems can allow, for the same OM and seasonal mode, one set-point value for use during a timed period and a different set-point value for use after the timed period.

The amount of energy usage, comfort, and energy/cost savings provided by an OM when activated (in use) for an area, is dependent on the current set-point(s), which can be changed, for example, by a user. Therefore, some systems can presume that each set-point will, when created, adjusted, or approved, be "voluntarily" kept "consistent" with the category of the OM for which it is created, adjusted, or approved, and can therefore be expected to result in a level of energy usage, comfort, and energy/cost savings (relative to at least one other OM(s) of different categories, associated with the area and when, instead, activated (in use)) that corresponds with the labeling and/or other means of representing the respective category of its associated OM. In order to limit each set-point to a value consistent with its associated OM's category, other systems may, in addition or instead of the above described presumption, impose limits or boundaries on how high or low a set-point can be set or adjusted, based on labeling or other means of representing the category of the OM for which the set-point applies (i.e., is associated) relative to at least one other OM(s) (presumed of different category) associated with the same area and when, instead, activated (in use).

A set-point that is "consistent" with an OM's category can be considered one that corresponds (e.g., fits in) best with the temperature range of that category as defined, labeled, or otherwise represented, compared with how well it corresponds (e.g., fits in) with any other OM category for the same area. Temperatures that can be included with, or associated with a category are relative to those of another category of the same area and seasonal mode. For example, for the heating seasonal mode and for OMs associated with the same area, set-points for an OM category represented (e.g., text labeled) as offering the most comfort (e.g., "comfort" category) is presumed to have set-points higher than those of a category represented as saving the most energy, and therefore offering the least comfort (e.g., "max-save" category), and set-points of a category represented as offering an in between amount of comfort and energy savings (e.g., "mid-save" category) is presumed to have set-points of values higher than those of the max-save category, and lower than those of the comfort category.

There can be various techniques of maintaining set-points consistent with their respective categories when, for example, each is created, adjusted or approved for use. For example, as described above, some systems can presume compliance to relative boundaries, i.e., when a set-point is created, adjusted or approved, (e.g., by a user) it is not constrained by logic to certain values or ranges, but is presumed to have a final value consistent with the category of its associated OM. For example, for OMs of the same area, and for the heating seasonal mode, when a set-point is created, adjusted or approved, it could have a final value of, for example, 70F or higher for a comfort OM's (e.g., comfort energy mode's) category, which is kept higher than set-points (e.g., 66F to 69F) for a mid-save OM's (e.g., mid-save energy mode's) category, and those set-points for the mid-save OM would be kept higher than set-points (e.g., up to 65F) for a max-save OM's (e.g., maximum energy saving mode's) category.

Other systems can impose fixed limits or boundaries to keep each associated set-point value consistent with the category of its associated OM. For example, in some systems, for the heating season, for a comfort OM, only set-points of 70F or higher may be allowed as final values; for a mid-save OM only set-points of 67 to 69F; and for a max-save OM only set-points of 66F or lower may be allowed, for the OMs of the same area, or in some systems, for OMs of all areas.

Other systems may impose a more "complete relative" type of limitation or boundary to maintain each set-point consistent with its respective OM's category. For example, for the heating season, the highest set-point of a max-save OM cannot equal or exceed the lowest set-point of a mid-save OM, and the highest set-point of a mid-save OM cannot equal or exceed the lowest set-point of a comfort OM, for the OMs of the same area, or in some systems, for OMs of all areas.

The above examples can also apply to set-points for the cooling season but the more comfortable values (having higher energy usage and less energy/cost savings), such as for a comfort OM, are of lower temperatures than the values for less comfort (having lower energy usage and more energy savings), such as for a mid-save or max-save OM.

Figure 3:
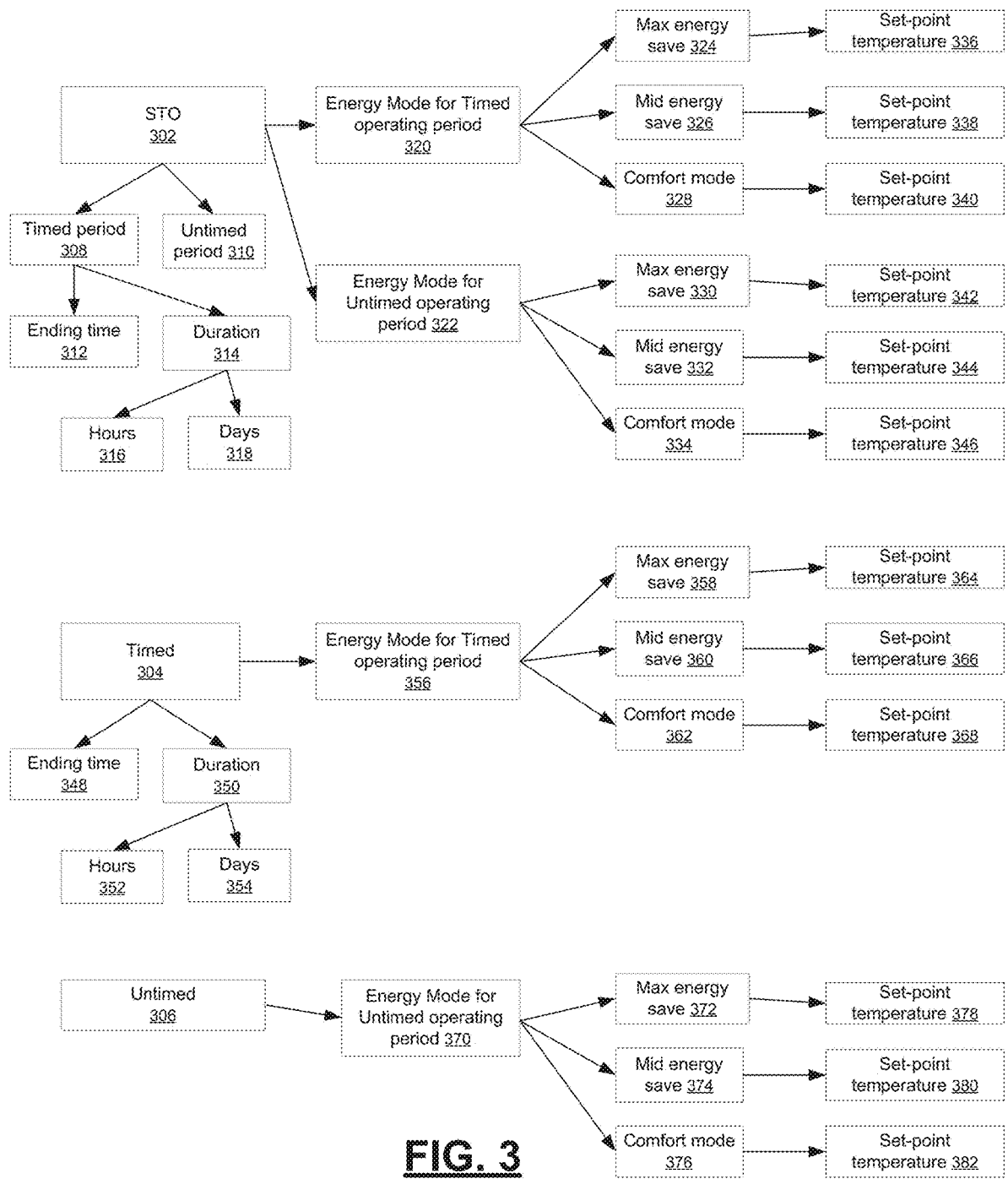
FIG. 3 is a block diagram depicting example operating modes of an example control system and parameters that may be specified for the operating modes, in accordance with some embodiments.

FIG. 3 is a block diagram depicting example operating sequences and operating modes of an example control system and parameters that may be specified for the operating modes. Three of the example operating sequences include a simple touch operation (STO) sequence 302, a timed sequence 304, and an untimed sequence 306.

In the example STO sequence 302, the control system provides a timed operating period 308 and an untimed operating period 310 following the timed operating period. The timed period length can be determined by an ending time 312 or a duration 314. The options for the duration 314 can be hours 316 or days 318. Thus, the parameters specified for the timed period include either an ending time 312 or a duration measured in hours 316 or days 318 in this example.

In some examples, the control system may control the environmental adjustment equipment using a ramping period at an end portion of the timed period. During the ramping period the control system may allow or cause the environmental adjustment equipment to transition from an area's current temperature (i.e., that is consistent with the category of the in-use energy mode prior selected for the area for the timed period) to a temperature consistent with the category of the energy mode selected for the area for the untimed period. Thus, in some systems, at a point in time that is prior to the expiration of the timed period by, for example, the amount of time of the ramping period, the operating mode prior-selected for use during the untimed period can be put in-use and the operating mode for the timed period can be unselected, causing the environmental adjustment equipment to begin transitioning, or ramping, the temperature of the area to a target temperature consistent with the category of the in-use operating mode for an untimed period. Some systems may allow the choice (e.g., for users and/or installers) of whether or not an initial timed period length parameter for a timed function (e.g., as initially received from, or last adjusted by a user) includes an amount of ramp (i.e., transition) time and, if included, may be subtracted out of the parameter prior to the parameter's use in determining when to change from the current in-use operating mode to the operating mode prior selected for use during an untimed period. In these systems, the choice or selection of whether or not an initial timed period length parameter includes an area temperature transition time and, therefore, should likely be reduced to allow time for the temperature transition(s). can, for example, be made during installation such as by an installer adjusting, for example, a switch or jumper type of device. In some systems, it may be decided instead, or in addition, by, for example, a user actuating a user accessible switch or jumper type of device, or via some type of programming device (or e.g., function) connected to or included in a user input section.

In some systems, the amount of time of temperature transition can be measured for each transition for each area when, for example, the in-use operating mode is changed. These ramp times, and perhaps also the set point values in use for each operating mode, can be stored as, for example, transition specific ramp times for later use. For a system having multiple monitored areas, if a timed period length parameter (e.g., as received or last adjusted) includes a ramping period of time and is, for example, to apply to the transition of temperatures of multiple areas, such as prior to the end of a timed period, then the timed period length parameter could be reduced by, for example, an average of the transition specific ramp times (or by, perhaps, the smallest stored value, or other, e.g., allocated, value) such that by the expiration of the initial timed period length, each area that was (e.g., selected) to include a ramping time in its transition has had its operating mode selected for untimed use, individually activated when needed in order to have the area's temperature (e.g., nearly) consistent with the area's operating mode now in use. Transition specific ramp times, whether generated as estimates, by measurements of transition times, or other techniques, can be used (e.g., by subtracting from an initial timed period length parameter) to create a potentially different timed period length parameter for each area transition to allow a different (i.e., more tailored) ramp time per area. This can, for example, accommodate large variations in actual temperature transition times while bringing each area to its new operating mode-determined temperature at approximately the time of the expiration of the initial timed period length parameter (e.g., as initially received, or as last adjusted). The above description of modifying a timed period length parameter can apply to increasing or decreasing it in the form of an amount of time (e.g., duration) or an ending clock time.

Two energy modes are specified for STO operation, an energy mode 320 for the timed period and an energy mode 322 for the untimed period. The example control system has three or more energy mode options for each of the energy mode 320 for the timed period and the energy mode 322 for the untimed period. In the illustrated example, three energy mode options are shown for each energy mode but in other examples more than three energy mode options may be available. The three example energy mode options include a maximum energy save mode 324, a mid-energy save mode 326, and a comfort energy mode 328 for the timed operating period and a maximum energy save mode 330, a mid-energy save mode 332, and a comfort energy mode 334 for the untimed operating period.

Each of the energy mode options may include a set-point temperature associated with the energy mode option. The maximum energy save option 324 for the timed operating period may have a corresponding set-point temperature 336, the mid-energy save option 326 for the timed operating period may have a corresponding set-point temperature 338, and the comfort energy mode option 328 for the timed operating period may have a corresponding set-point temperature 340. Similarly, the maximum energy save option 330 for the untimed operating period may have a corresponding set-point temperature 342, the mid-energy save option 332 for the untimed operating period may have a corresponding set-point temperature 344, and the comfort energy mode option 334 for the untimed operating period may have a corresponding set-point temperature 346. Each of the set-point temperatures may be set independently of the other set-point temperatures and consequently have different values. The set-point temperatures initially may be factory supplied and may be subsequently changed by a user.

In the example timed sequence 304, the control system provides a timed operating period only. The timed period can be determined by an ending time 348 or a duration 350. The options for the duration 350 can be hours 352 or days 354. Thus, the parameters specified for the timed period include either an ending time 348 or a duration measured in hours 352 or days 354 in this example.

One energy mode is specified for use during the example timed sequence 304, an energy mode 356 for a timed period. The example control system has three or more energy mode options for the energy mode 356. In the illustrated example, three energy mode options are shown for the energy mode but in other examples more than three energy mode options may be available. The three example energy mode options include a maximum energy save mode 358, a mid-energy save mode 360, and a comfort energy mode 362 for the timed operating period.

Each of the energy mode options may include a set-point temperature associated with the energy mode option. The maximum energy save option 358 for the timed operating period may have a corresponding set-point temperature 364, the mid-energy save option 360 for the timed operating period may have a corresponding set-point temperature 366, and the comfort energy mode option 362 for the timed operating period may have a corresponding set-point temperature 368. Each of the set-point temperatures may be set independently of the other set-point temperatures and consequently have different values. The set-point temperatures initially may be factory supplied and may be subsequently changed by a user.

In the example untimed sequence 306, the control system provides an untimed operating period only. The example control system has three or more energy mode options for the energy mode 370 for the untimed period. In the illustrated example, three energy mode options are shown for the energy mode but in other examples more than three energy mode options may be available. The three example energy mode options include a maximum energy save mode 372, a mid-energy save mode 374, and a comfort energy mode 376 for the untimed operating period.

The energy mode options may include a set-point temperature associated with the energy mode option. The maximum energy save option 372 may have a corresponding set-point temperature 378, the mid-energy save option 374 may have a corresponding set-point temperature 380, and the comfort energy mode option 376 may have a corresponding set-point temperature 382. Each of the set-point temperatures may be set independently of the other set-point temperatures and consequently have different values. The set-point temperatures initially may be factory supplied and may be subsequently changed by a user.

Figure 4:
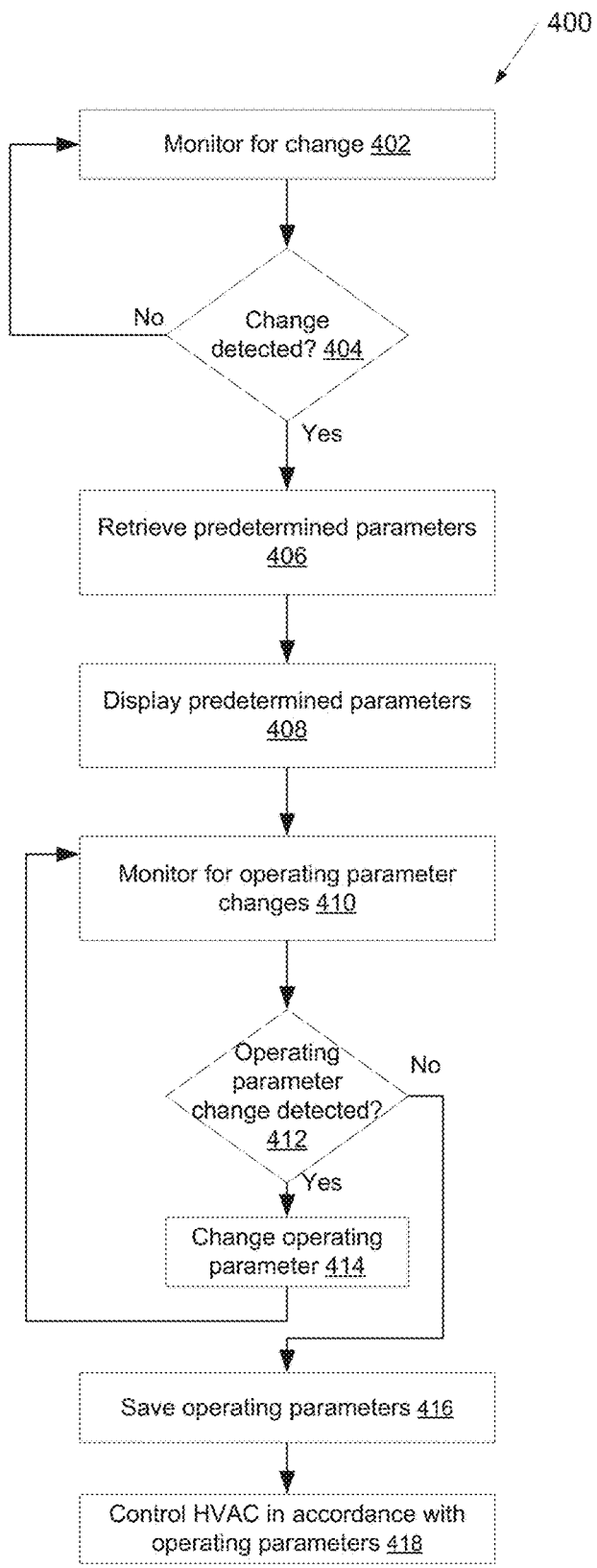
FIG. 4 is a process flow chart depicting an example process performed by an example control system to change an operating sequence and/or operating mode when controlling environmental adjustment equipment, in accordance with some embodiments.

FIG. 4 is a process flow chart depicting an example process 400 performed by an example control system to change an operating sequence and/or operating mode when controlling environmental adjustment equipment. When operating to control environmental adjustment equipment, the example control system monitors for a user inputted operating sequence and/or operating mode change (operation 402). If a change is not detected (no at decision 404), the example control system continues to monitor for a user inputted operating sequence and/or mode change while operating to control environmental adjustment equipment. If a change is detected (yes at decision 404), the example control system retrieves predetermined operating parameters for the operating sequence and/or operating mode (operation 406) such as last used operating mode(s) for the operating sequence, last used or factory-set set point information and/or information used to provide its associated operating mode's output indication via an output indication section. These predetermined operating parameters may be stored in memory associated with the example control system. Factory preset operating parameters for the operating sequence and/or operating mode may be retrieved if, for example, the operating sequence and/or operating mode parameters had not since been entered or adjusted by, for example, a user.

After retrieving the predetermined (e.g., last used) operating parameters, the example control system may display them to a user on an output indication section (operation 408). The example control system then monitors for user inputted operating parameter changes such as to a set point or to select a different operating mode for use (operation 410). If no operating parameter changes are detected within a predetermined no-activity timeout period, or in some systems when an "accept", "confirm" or "done" switch (not shown) is actuated or when a predefined sequence of switch or other sensing input actuations are performed to indicate no more input data is to be received (no at decision 412), the example control system can proceed to controlling the environmental adjustment equipment in accordance with the operating parameters (operation 418). This allows one touch operation by a user to switch operating modes. By touching one switch or another sensing input such as included by a touch-screen (e.g., touch sensor), a user can switch the control system to a new operating sequence and/or operating mode using predetermined operating parameters such as those last used for that operating mode.

If the user desires to change the operating parameters, the user can indicate the change of operating parameters using the user input section. If the example control system senses user inputted operating parameter changes (yes at decision 412), the example control system changes the operating parameters per the user inputted changes (operation 414). The example control system monitors for additional user inputted operating parameter changes (operation 410). If the example control system senses additional user inputted operating parameter changes (yes at decision 412), the example control system changes the operating parameters per the user inputted changes (operation 414) and continues to monitor for additional user inputted operating parameter changes (operation 410). If no additional operating parameter changes are detected within a predetermined a predetermined no-activity timeout period, or in some systems when a "confirm" or "done" switch (not shown) is actuated or when a predefined sequence of switch or other sensing input actuations are performed to indicate no more input data is to be received (no at decision 412), the example control system can save the operating parameters (operation 416) as last used and proceed to controlling the environmental adjustment equipment in accordance with the operating parameters (operation 418).

Though FIG. 4 shows operations that can retrieve and display predetermined operating parameters (e.g., last used or factory default), such as described for operations 406 and 408, some systems may not include either or both operations, instead displaying, for example, no parameters or non-last used parameters, and changing those parameters when modifying data is detected.

Figure 5:
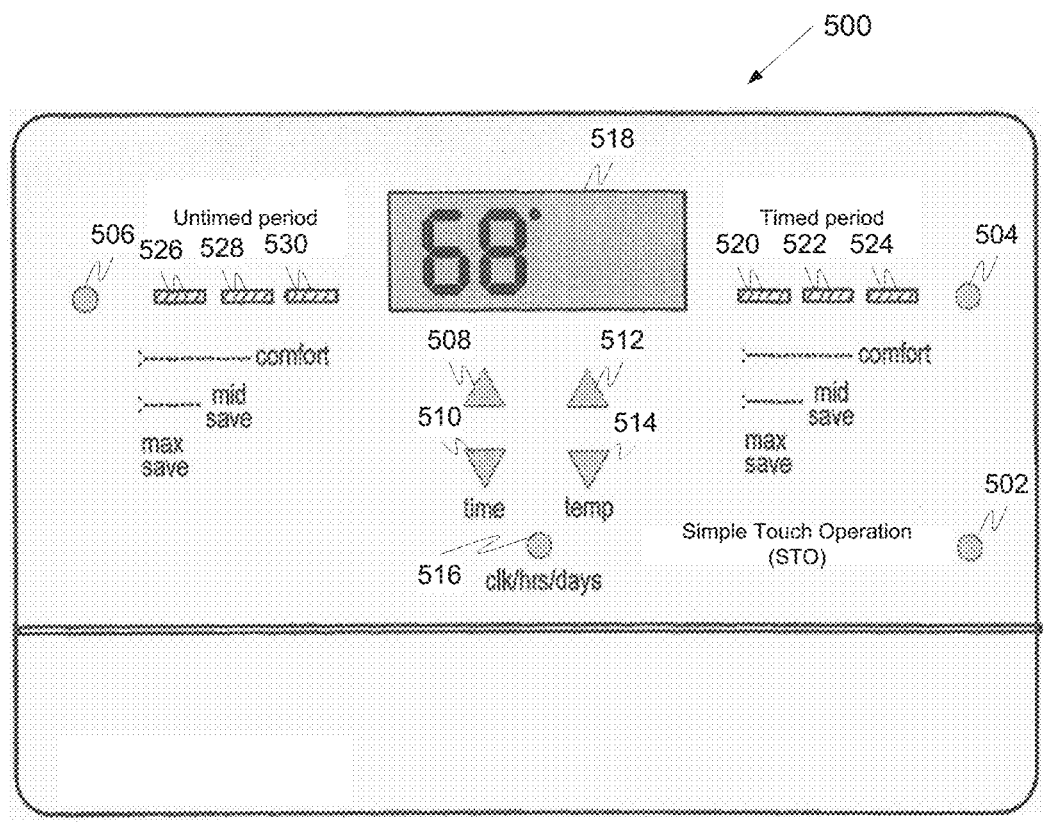
FIG. 5 is a diagram depicting an example user interface device in the form of a control panel that can be used by a user to input mode changes and operating parameter changes, in accordance with some embodiments.

FIG. 5 is a diagram depicting an example user interface device 500 in the form of a control panel that can be used by a user to input mode changes and operating parameter changes. The example user interface device 500 includes a user input section for sensing user input and an output indication section. The example user input section includes a simple touch operation sensing input exemplified by simple touch operation touch switch 502, a timed period energy mode selection switch 504, an untimed period energy mode selection switch 506, an increment timed period adjustment switch 508, a decrement timed period adjustment switch 510, an increment set-point temperature adjustment switch 512, a decrement set-point temperature adjustment switch 514, and a timed period type/scale adjustment switch 516. The example output indication section includes a display panel 518, a first energy mode selection indicator 520 for a timed period, a second energy mode selection indicator 522 for a timed period, and a third energy mode selection indicator 524 for a timed period. The example output indication section also includes a first energy mode selection indicator 526 for an untimed period, a second energy mode selection indicator 528 for an untimed period, and a third energy mode selection indicator 530 for an untimed period.

The example user interface device can be used to provide both user input information such as desired operating parameters for environmental adjustment equipment from the user input section and output indication information regarding operating parameters for the environmental adjustment equipment to the output indication section for display to a user. The example user interface device 500 is illustrated as having a separate display shown with input devices (e.g., switches) and output indicators (e.g., energy mode selection indicators) located on either side of the display and below it. Other methods and techniques of providing user interface with functions and features such as shown and described herein may include use of, for example, a Graphical User Interface (GUI) such as may utilize a touch-screen LCD and/or other type display(s), perhaps in combination with one or more input devices and/or output indicators external to the screen/display(s), to both display output indications and allow user input, such as shown and/or described herein. User input on a touch-screen may be provided via various types of touch gestures, such as a tap gesture (e.g., tap to select one of multiple pictured buttons), a swipe gesture (e.g., swipe up, down, left, or right, to change screens), single finger touch gestures, multiple finger touch gestures, or others.

In this example, engagement of the STO switch 502 may initiate the STO sequence using predetermined parameters such as those last used by an STO sequence. One or more of the operating parameters for the STO sequence may be changed by engagement of other switches. For example, engagement of the timed period energy mode selection switch 504 may allow for the switching of the energy mode for the timed period of the STO sequence. Engagement of the untimed period energy mode selection switch 506 may allow for the switching of the energy mode of the untimed period of the STO sequence. Engagement of the increment timed period adjustment switch 508 may allow for incrementing the length of the timed period. Engagement of the decrement timed period adjustment switch 510 may allow for decrementing the length of the timed period. Engagement of the increment set-point temperature adjustment switch 512 may allow for incrementing the set-point temperature for a selected energy mode. Engagement of the decrement set-point temperature adjustment switch 514 may allow for decrementing the set-point temperature for a selected energy mode. Engagement of the timed period type/scale adjustment switch 516 may allow for switching the timed period measurement between duration or ending time, and changing the scale of the duration between hours and days In this example panel, once switch 502 is engaged (actuated), actuations of example switches 504, 506, 508, 510, 512, 514 and 516 will have their intended effects as described above if performed prior to expiration of the STO mode no-activity timeout period in some systems, or, in some systems, prior to actuation of a "confirm" or "done" switch (not shown), or, for example, prior to when a predefined sequence of switch actuations are performed to indicate no more input data is to be received.

During and after operating modes and operating parameters are selected or switched, the output indication section can display an indication of selected operating modes and operating parameters. For example, engagement of the STO switch 502 to initiate the STO sequence may lead to energization of one or more of the first energy mode selection indicator 520 for the timed period, the second energy mode selection indicator 522 for the timed period, the third energy mode selection indicator 524 for the timed period, the first energy mode selection indicator 526 for the untimed period, the second energy mode selection indicator 528 for the untimed period, and the third energy mode selection indicator 530 for the untimed period. Engagement of the STO switch 502 could also cause an output indicator (not shown) to be blinked, for example, to show that a STO sequence has been initiated, and any changes to STO operating parameters, such as selecting an operating mode and/or adjustment of a timed period length parameter may be undertaken. After a predetermined no-activity timeout period during which, for example, no switches are engaged, or in some systems, when a "confirm" or "done" switch (not shown) is actuated, or when another technique such as a predefined sequence of switch actuations is performed to indicate no more input data is to be received, for example, for the current user session, the output indicator (not shown) could be transitioned to "on" with no blinking to indicate, for example that the control system has saved the operating parameters and proceeded to controlling the environmental adjustment equipment in accordance with the operating parameters. The output indicator (not shown), when "on" with no blinking can indicate at any subsequent time that an STO sequence in progress.

In this example, energization of only the first energy mode selection indicator 520 for the timed period indicates selection of the first energy mode for the timed period, the max save energy mode in this example. Energization of the first energy mode selection indicator 520 and the second energy mode selection indicator 522 for the timed period indicates selection of the second energy mode for the timed period, the mid save energy mode in this example. Energization of the first energy mode selection indicator 520, the second energy mode selection indicator 522 for the timed period for the timed period, and the third energy mode selection indicator 524 for the timed period indicates selection of the third energy mode for the timed period, the comfort energy mode in this example.

Similarly, energization of only the first energy mode selection indicator 526 for the untimed period indicates selection of the first energy mode for the untimed period, the max save energy mode in this example. Energization of the first energy mode selection indicator 526 and the second energy mode selection indicator 528 for the untimed period indicates selection of the second energy mode for the untimed period, the mid save energy mode in this example. Energization of the first energy mode selection indicator 526, the second energy mode selection indicator 528, and the third energy mode selection indicator 530 for the untimed period indicates selection of the third energy mode for the untimed period, the comfort energy mode in this example.

In other examples, energy mode selection indicators may be used in different ways to indicate a selected energy mode. For example, the first, second, and third energy mode selection indicators for each of the timed period and the untimed period may be positioned in the shape of a bar graph or slot and the amount (e.g., length, or length times width size) of the illuminated portion of the bar graph may indicate the energy mode selection. In another example, the number of illuminated energy mode selection indicators may indicate the energy mode selection. In another example, the color of the illuminated energy mode selection indicators may indicate the energy mode selection. For example, the illumination of one or more energy mode selection indicators in a first color may indicate a first energy mode. The illumination of one or more energy mode selection indicators in a second color may indicate a second energy mode. The illumination of one or more energy mode selection indicators in a third color may indicate a third energy mode. In yet another example, the first, second, and third energy mode selection indicators for each of the timed period and the untimed period may be positioned in a proximate relationship in a shape, and the amount or percentage of the illuminated portion of the shape (which, for example, could be represented by the length of a slot or area of a slot such as length times width) may indicate the energy mode selection. In another example, each energy mode selection indicator may be arranged in a different shape. The illumination of an energy mode selection indicator and thus a shape may indicate the selection of an energy mode.

The example energy mode selection indicators such as shown in FIG. 5 can, in addition to indicating which energy mode is selected, indicate the amount of energy usage of the selected mode relative to other modes for the area, and therefore, be considered as a graphical measurement of the energy usage of the selected operating mode relative to the energy usage of the other operating modes for the same area when their respective amount of energy usage is instead displayed via substantially the same type of graphical measurement. Graphical measurements of the same "type" can be considered those that appear of like kind, that show more or less of whatever characteristic(s) of the output indications distinguish(es) one operating (e.g., energy) mode from another when each operating (e.g., energy) mode is (in turn) shown as indicated (i.e., selected). For example, as the example energy mode selection indicators are arranged on interface device 500, the number of illuminated energy mode selection indicators can distinguish one energy mode from another, as can the total amount of illuminated area (e.g., length of illuminated slot(s), or length times width area of illuminated slot(s)) of the energy mode selection indicators for an energy mode, either of which can be considered a characteristic where more or less of it (i.e., of the number of indicators, or amount of illuminated area) differentiates which energy mode is selected and the amount of energy usage relative to other energy modes. In this example, the greater the number of illuminated energy mode selection indicators making up a displayed graphical measurement, the greater the energy usage, or the greater the amount of illuminated area of energy mode selection indicators making up a displayed graphical measurement, the greater the energy usage. Though the examples above describe a graphical measurement of energy usage that may display the same each time its associated operating (e.g., energy) mode is shown as selected, some systems can change what the graphical measurement associated with a selected operating mode displays, for example, by showing any of various amounts of energy usage such as could be based on the set point currently being used. In some systems, a first operating mode's associated graphical measurement of its energy level could show more energy usage (e.g., due to large movement of its current set point) than that of a second operating mode labeled or otherwise represented or presented as using more energy than the first operating mode.

Engagement of the increment set-point temperature adjustment switch 512 and/or the decrement set-point temperature adjustment switch 514 can result in a display of the set-point temperature for a selected energy mode. Engagement of the increment timed period adjustment switch 508 or the decrement timed period adjustment switch 510 can result in a display of a predetermined timed period length parameter on the display panel 518, such as a number of hours or ending clock time that was last used for a STO timed period, or for example, a factory-set value. Engagement of the STO switch 502 to initiate the STO sequence can also cause a predetermined (e.g., last used) length parameter to be displayed in display 518. The length parameter can be first shown in a predetermined type and/or value, such as the last used number of hours for the STO timed period, or the number of days and hours last used for the STO timed period, or the ending clock time last used for the STO timed period. Each successive actuation of the timed period type/scale adjustment switch 516 can result in the displayed timed period length parameter to incrementally sequence through being shown as a number of hours, as a number of days and hours, and as an ending clock time for the timed period. Some systems may offer more or less choices for a user to indicate how and/or when a timed period length is to be displayed, modified, and retrieved. For example, some systems may include use of only one type of timed period length parameter such as number of hours and/or days, or an ending clock time. Some systems may allow one of a number of different timed period length parameters to be retrieved for use when a particular timed period operating (e.g., energy) mode is selected. Some systems may allow timed period length parameters to be programmed to be retrieved and used at particular scheduled clock times with, for example, particular operating (e.g., energy) modes. Successive engagement of the timed period switch 504 can result in a cycling through the energy mode options for the timed period. Successive engagement of the untimed period switch 506 can result in a cycling through the energy mode options for the untimed period.

Successive engagement of the increment timed period adjustment switch 508 and/or the decrement timed period adjustment switch 510 can result in the incrementing or decrementing of the display of the timed period duration or ending time on the display panel 518. Successive engagement of the increment set-point temperature adjustment switch 512 and/or the decrement set-point temperature adjustment switch 514 can result in the incrementing or decrementing of the display of the set-point temperature for a selected energy mode.

The example user interface device 500 has been described as having the ability to display last used operating parameters in response to the actuation of switches 502, 504, 506. In other examples, a user interface device may display other predetermined operating parameters such as factory preset values.

As described earlier, switches such as switches 502-516 can represent sensing inputs such as (e.g., panel-mounted) push button switches, or other types of sensing inputs for sensing user input such as touch sensors that may be included as part of a touch-screen Graphical User Interface such as may be included in a smart phone or other mobile device that senses user input by, for example, sensing the touch of a finger.

The example user interface device 500 has been described as utilizing switch-type devices for actuation as a means of receiving input information (e.g., from a user), however other example user interface devices could be arranged differently to provide similar operation that include sensing inputs other than switches or switch-type devices. For example, a sensing input device could be in the form of a light sensing circuit that can provide, for example, two "actuated" outputs to a user interface device. One actuated output "A" can be provided when the circuit senses an amount of light greater than a (e.g., adjustable) minimum threshold, and a different actuated output "B" when it senses less than a (e.g., adjustable) maximum threshold. These types of actuated outputs can be defined to have particular meanings for some user interface devices, such as if a user actuated one or more switches in a predetermined fashion. As such, an actuated output "A" could be predetermined to mean enough actuation(s) of untimed period energy mode selection switch 506 to select the comfort operating mode, and "B" could mean an actuation of STO switch 502 to initiate an STO sequence. As such, for example, an operating mode could be selected by sunlight entering a room (e.g., detected light above a threshold causes "A"), or an STO sequence initiated by the onset of darkness (e.g., detected light below a threshold causes "B").

Another example of a sensing input device could be in the form of a sound detection circuit that can provide, for example, three "actuated" outputs such as based on, for example, sensing a level of sound greater than a (e.g., adjustable) minimum threshold, less than a (e.g., adjustable) maximum threshold, or in a range in between the minimum and maximum thresholds. As such, some user interface devices could be arranged to, for example, respond to each of the three "actuated" outputs where each is treated as, for example, actuating untimed period energy mode selection switch 506 enough times to select, for example, the max save mode for a minimum sound (e.g., no one home) actuated output, the mid save mode for an in between level of sound (e.g., day time) actuated output, and the comfort mode for a maximum sound (e.g., evening) actuated output.

Another example of a sensing input device can be in the form of a proximity detector that detects, for example, the presence or absence of people and generates, for example, two "actuated" outputs, one for no persons present and a second in response to people in the area. As such, for example, some user interface devices could be arranged to select either of two different operating modes based on whether or not people are present in an area. Another example of an input device can be in the form of a Voice Recognition Unit (VRU) that, for example, can convert sensed sound into a digital format and compare that with a stored library of digitized simple voice commands that, for example, apply to operation of a system such as described herein. For example, the VRU could generate any one of multiple "actuated" outputs when a detected phrase such as "start STO" is recognized which, in this example, could be treated as if a user actuated STO switch 502. In similar fashion, the VRU recognizing a detected phrase such as "select untimed comfort" could result in it generating an "actuated" output that is treated by some user interface devices as a user actuating untimed period energy mode selection switch 506 enough times to select the comfort operating mode, and the VRU recognizing a detected phrase such as "select untimed max save" could result in it generating a different "actuated" output that is also treated by some user interface devices as a user actuating untimed period energy mode selection switch 506 but in this case, enough times to select the max save operating mode. Sensing input devices in other forms than described above and elsewhere herein that can generate "actuated" outputs are possible.

Figure 6:
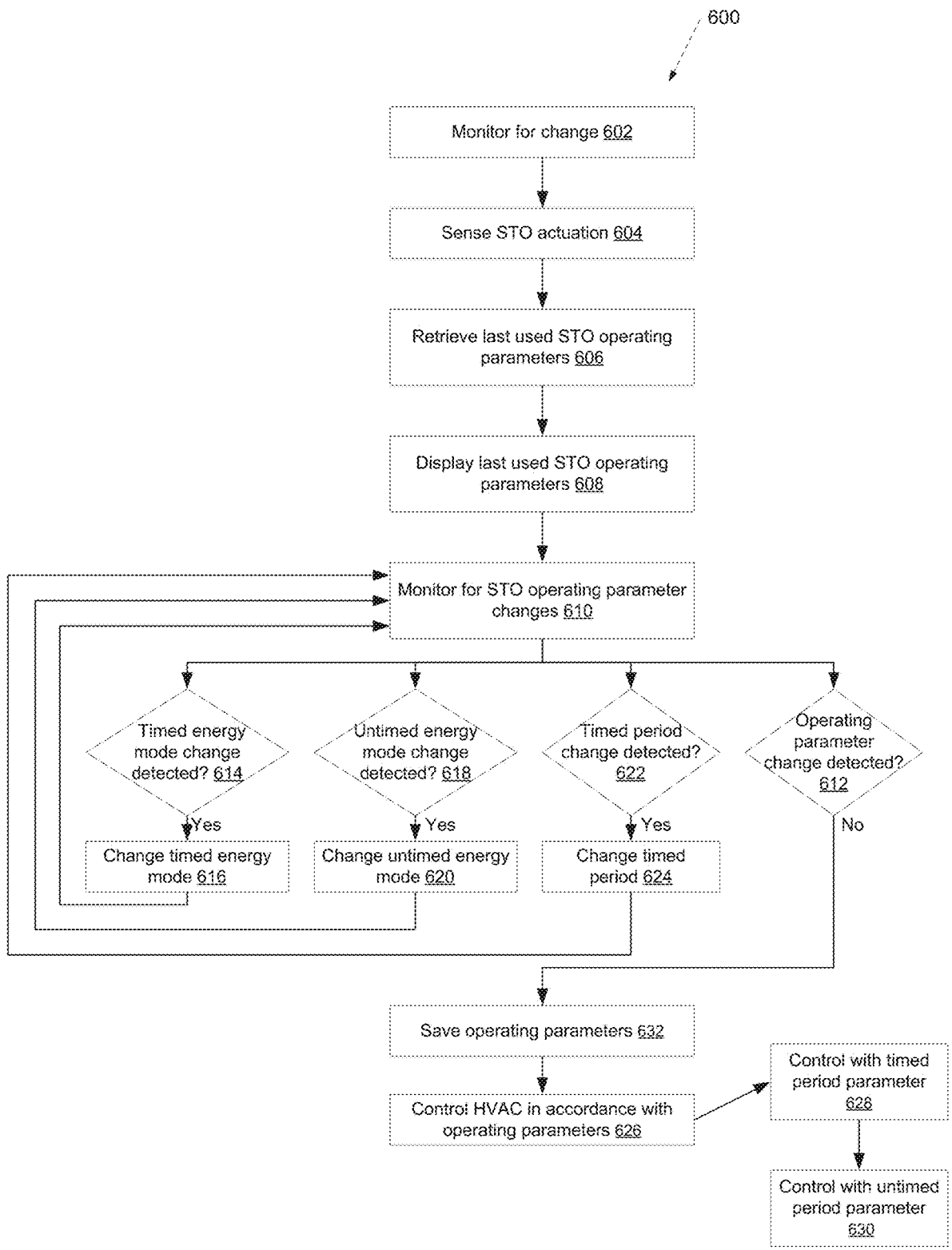
FIG. 6 is a process flow chart depicting an example process performed by an example control system to change to a STO control mode when controlling environmental adjustment equipment, in accordance with some embodiments.

FIG. 6 is a process flow chart depicting an example process 600 performed by an example control system to change to a STO control mode when controlling environmental adjustment equipment. When operating to control environmental adjustment equipment, the example control system monitors for a user inputted mode change (operation 602). The example control system detects an STO sequence change (operation 604). The example control system retrieves predetermined operating parameters such as last used or factory preset values for the STO sequence (operation 606), which may be stored in memory associated with the example control system.

After retrieving the last used operating parameters for the STO sequence, the example control system may display the last used operation parameters for the STO sequence to a user on an output indication section (operation 608). The example control system then monitors for user inputted STO operating parameter changes (operation 610). If no operating parameter changes are detected within a predetermined no-activity timeout period, or in some systems, when a "confirm" or "done" switch (not shown) is actuated, or when a predefined sequence of sensing input (e.g., switch) actuations are performed to indicate no more input data is to be received (no at decision 612), then the example control system can proceed to controlling the environmental adjustment equipment in accordance with the operating parameters (operation 626). This may involve controlling the environmental adjustment equipment with the timed period parameters (operation 628) and, typically, after expiration of the timed period controlling the environmental adjustment equipment with the untimed period parameters (operation 630). This may allow one touch operation by, for example, with one sensing input (e.g., switch) actuation switching from untimed operation to timed mode and then back to untimed operation at expiration of the timed period. In this example, by actuating (e.g., touching) one sensing input (e.g., switch), a user can switch the control system to a new operating mode that may include the use of a timed period using the operating parameters last used for that operating mode.

If the user desires to change the operating parameters for a mode, the user can indicate the change of operating parameters using the user input section. If the example control system senses a timed energy mode change (yes at decision 614), the example control system changes the timed energy mode operating parameters per the user inputted changes (operation 616) and continues to monitor for additional user inputted operating parameter changes (operation 610). If the example control system senses an untimed energy mode change (yes at decision 618), the example control system changes the untimed energy mode operating parameters per the user inputted changes (operation 620) and continues to monitor for additional user inputted operating parameter changes (operation 610). If the example control system senses a change of a timed period length parameter (yes at decision 622), the example control system changes the timed period per the user inputted changes (operation 624) and continues to monitor for additional user inputted operating parameter changes (operation 610). After a predetermined no-activity timeout period during which, for example, no switches are engaged, or in some systems, when a "confirm" or "done" switch (not shown) is actuated, or when another technique such as a predefined sequence of sensing input (e.g., switch) actuations is performed to indicate no more input data is to be received, for example, for the current user session, (no at decision 612), the example control system can save the operating parameters (operation 632) as last used and proceed to controlling the environmental adjustment equipment in accordance with the operating parameters (operation 626).

The example process 600 has been described as having operations that use last used operating parameters. In other examples, operations may be included that use other predetermined operating parameters such as factory preset values.

Figure 7:
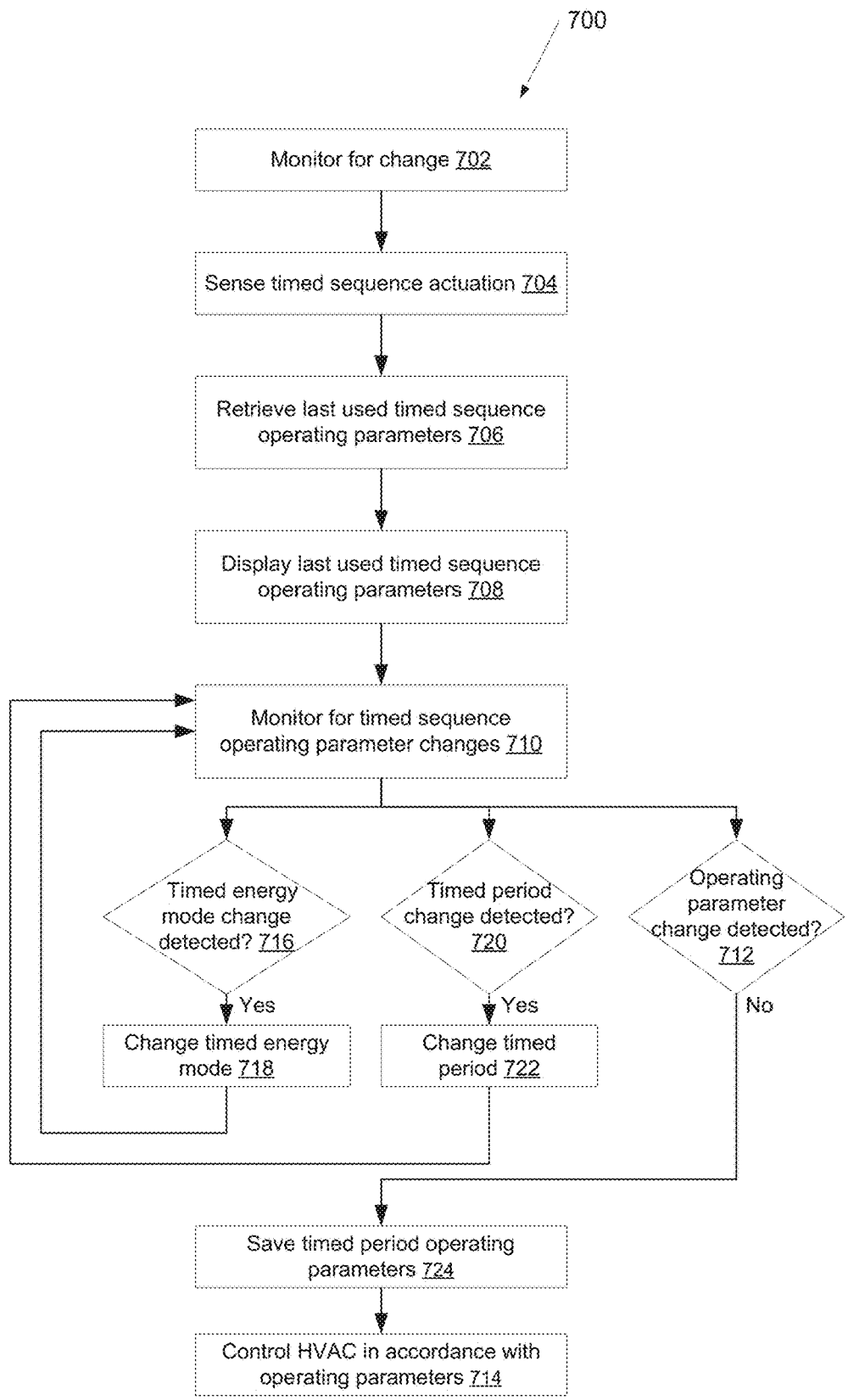
FIG. 7 is a process flow chart depicting an example process performed by an example control system to change to a timed period operating mode when controlling environmental adjustment equipment, in accordance with some embodiments.

FIG. 7 is a process flow chart depicting an example process 700 performed by an example control system to change to a timed period control mode when controlling environmental adjustment equipment. When operating to control environmental adjustment equipment, the example control system monitors for a user inputted mode change (operation 702) such as actuation of switch 504. When a timed sequence change is detected (operation 704), the example control system retrieves predetermined operating parameters such as the last used operating parameters for the timed sequence (operation 706). Retrieving the predetermined operating parameters for the timed sequence may involve retrieving, for example, last used values, and factory preset operating parameters for the timed sequence if they had not been previously entered or adjusted, for example, by a user.

After retrieving the last used operating parameters for the timed sequence, the example control system may display the last used operation parameters for the timed sequence to a user on an output indication section (operation 708). The example control system then monitors for user inputted operating parameter changes (operation 710). If no operating parameter changes are detected within a predetermined no-activity period or some other method confirms that operating parameters are not being inputted (such as described herein) (no at decision 712), the example control system can proceed to controlling the environmental adjustment equipment in accordance with the operating parameters (operation 714). Though not shown, operation 714 may include operations such as described for operations 628 and 630 regarding HVAC control in accordance with usage of timed and untimed period parameters, and any ramping periods. This may allow one touch operation by a user to switch operating modes and which may also include timed and then, at expiration of the timed period, untimed period operation. In this example by actuating (e.g., touching) one switch, a user can switch the control system to a new operating mode using the operating parameters such as those last used for that operating mode.

If the user desires to change the operating parameters for the timed sequence, the user can indicate the change of operating parameters using the user input section. If the example control system senses a timed energy mode change (yes at decision 716), the example control system changes the timed energy mode operating parameters per the user inputted changes (operation 718) and continues to monitor for additional user inputted operating parameter changes (operation 710). If the example control system senses a timed period change (yes at decision 720), the example control system changes, for example, the timed period length parameter per the user inputted changes (operation 722) and continues to monitor for additional user inputted operating parameter changes (operation 710).

After a predetermined no-activity timeout period during which, for example, no switches are engaged, or in some systems, when a "confirm" or "done" switch (not shown) is actuated, or when another technique such as a predefined sequence of switch actuations is performed to indicate no more input data is to be received, for example, during the current user session, (no at decision 712), the example control system can save the operating parameters (operation 724) as last used and proceed to controlling the environmental adjustment equipment in accordance with the operating parameters (operation 714). The example process 700 has been described as having operations that use last used operating parameters. In other examples, operations may be included that use other predetermined operating parameters such as factory preset values.

Figure 8:
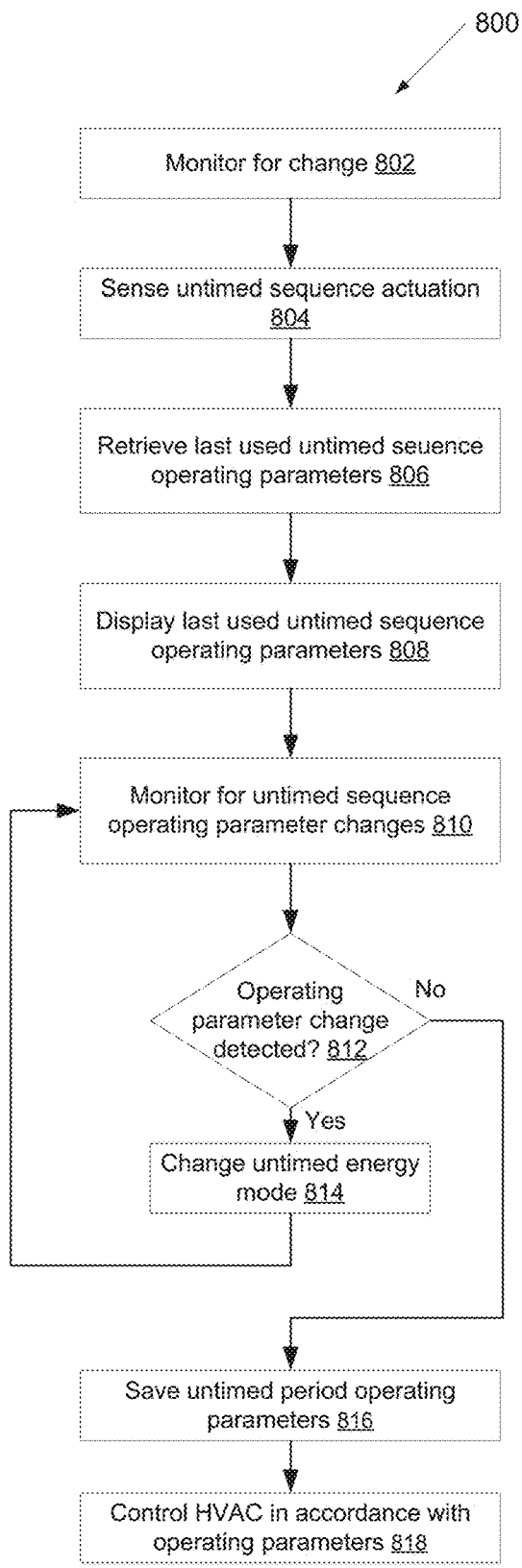
FIG. 8 is a process flow chart depicting an example process performed by an example control system to change to an untimed period operating mode when controlling environmental adjustment equipment, in accordance with some embodiments.

FIG. 8 is a process flow chart depicting an example process 800 performed by an example control system to change to an untimed period control mode when controlling environmental adjustment equipment. When operating to control environmental adjustment equipment, the example control system monitors for the expiration of a timed period or input information indicating a request to change an untimed period energy mode such as by actuation of untimed period energy mode selection switch 506 (operation 802). If a newly expired timed period or input device actuation(s) indicate to change the untimed period energy mode (operation 804), the example control system retrieves predetermined operating parameters such as the last used values for the untimed sequence (operation 806), which may be stored in memory associated with the example control system. Retrieving predetermined operating parameters for the untimed sequence may include retrieving, for example, last used values, and/or factory preset operating parameters for the mode if the operating mode parameters had not been previously entered or adjusted.

After retrieving the last used operating parameters for the mode, the example control system may display the last used operation parameters for the untimed sequence to a user on an output indication section (operation 808). The example control system then monitors for user inputted operating parameter changes (operation 810). After a predetermined no-activity timeout period during which, for example, no switches are engaged, or in some systems, when a "confirm" or "done" switch (not shown) is actuated, or when another technique such as a predefined sequence of sensing input (e.g., switch) actuations is performed to indicate no more input data is to be received, for example, for the current user session, (no at decision 812), the example control system can proceed to controlling the environmental adjustment equipment in accordance with the operating parameters (operation 818). This may allow one touch operation by a user to switch operating modes. In this example by actuating (e.g., touching) one sensing input (e.g., switch), a user can switch the control system to a new operating mode using the operating parameters last used for that operating mode.

If the user desires to change the operating parameters for a mode, the user can indicate the change of operating parameters using the user input section. If the example control system senses user inputted operating parameter changes (yes at decision 812), the example control system changes the operating parameters per the user inputted changes (operation 814). The example control system monitors for additional user inputted operating parameter changes (operation 810). If the example control system senses additional user inputted operating parameter changes (yes at decision 812), the example control system changes the operating parameters per the user inputted changes (operation 814) and continues to monitor for additional user inputted operating parameter changes (operation 810). After a predetermined no-activity timeout period during which, for example, no switches are engaged, or in some systems, when a "confirm" or "done" switch (not shown) is actuated, or when another technique such as a predefined sequence of sensing input (e.g., switch) actuations is performed to indicate no more input data is to be received, for example, for the current user session, (no at decision 812), the example control system can save the operating parameters (operation 816) as last used and proceed to controlling the environmental adjustment equipment in accordance with the operating parameters (operation 818).

Figure 9:
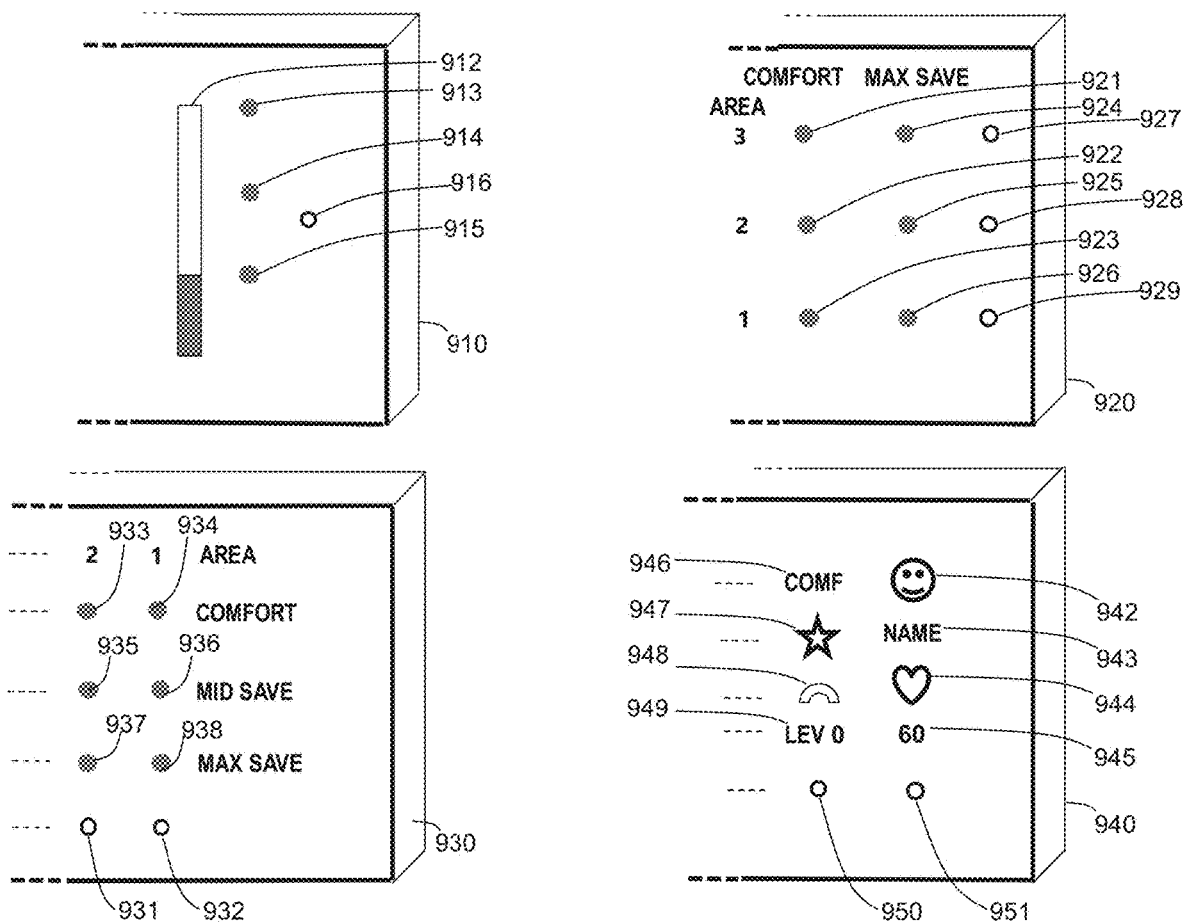
FIG. 9 is a diagram depicting portions of four example user interface devices or control panels.

FIG. 9 is a diagram depicting portions of four example user interface devices or control panels 910, 920, 930, 940. Example panel 910 can be used to control and display output indications for one monitored area. Example panel 910 includes a mode selection switch 916 that when actuated (e.g., pushed momentarily by a user) can be used to select or cycle through operating modes to, for example, select one for use (i.e., activation). Example panel 910 also includes an output indicator 912 in the shape of a slot that when illuminated can indicate the selected operating mode for a monitored area, and the output indicator 912 may also indicate the amount of energy usage of the indicated selected mode, relative to other modes for the area, particularly advantageous if the operating modes are labeled and/or otherwise presented or represented as energy modes. The shape of light (or the shape of visibly distinguishable less light such as darkness, or the shape of displayed information that is darker than its background such as presented by some LCD or other technology displays) and/or the size or amount of illuminated area such as of the indicator 912 can be a graphical (e.g., non-numerical) indicator of the operating mode for a monitored area and may also indicate the amount of energy usage of the selected mode relative to other modes for the area, and therefore, be considered as a graphical measurement of the amount of energy usage of the operating mode relative to the energy usage of another operating mode for the same area when its amount of energy usage is instead displayed via the same type of graphical measurement (described further for FIG. 5).

For example, similar to energy mode selection indicators 520, 522, 524 associated with a timed period, and energy mode selection indicators 526, 528, 530 associated with an untimed period, the size or amount of area (e.g., length times width), or slot length illuminated of output indicator 912 for one operating mode compared with that of one or more of the other operating modes (when indicated i.e., "on") can indicate both if the operating mode is selected, and the amount of energy usage of the indicated operating mode. In the example of output indicator 912, when comparing operating modes for their relative amounts of energy usage, the greater the size or amount of area or slot length illuminated, the greater the amount of energy usage. As such, for example, an illuminated one third of the indicator can indicate the least amount of energy usage (e.g., that the max save energy mode is selected), the fully illuminated indicator can indicate the maximum amount of energy usage (e.g., that the comfort energy mode is selected), and an illuminated two thirds of the indicator can indicate a relative in between amount of energy usage (e.g., that the mid save energy mode is selected).

Example panel 910 also includes output indicators 913, 914, 915, which also can be a graphical indicator of the operating mode for a monitored area and provide graphical measurement of the amount of energy usage of an operating mode relative to that of other operating mode(s) (when instead selected). In one example, the illumination of output indicator 913 may indicate a first operating mode, the illumination of output indicator 914 may indicate a second operating mode, and the illumination of output indicator 915 may indicate a third operating mode. In other examples, the illumination of one of the output indicators 913, 914, 915 may indicate a first operating mode, the illumination of two of the output indicators 913, 914, 915 may indicate a second operating mode, and the illumination of all three output indicators 913, 914, 915 may indicate a third operating mode. In this case, the relative number of output indicators in the "on" state, or the total size or amount of illuminated area of output indicators in the "on" state can indicate which operating mode is selected and its relative amount of energy usage compared with other operating mode(s) when instead selected (i.e., output indication "on"). This is particularly advantageous if the operating modes are labeled and/or otherwise presented or represented as energy modes. For example, the illumination of all three output indicators (i.e., full/complete illumination of the indicators used to indicate the energy operating modes for the area) can indicate/convey that the maximum amount of energy usage (e.g., that the comfort energy mode is selected), the illumination of one indicator can indicate/convey that the least amount of energy is being used (e.g., that the max save energy mode is selected), and the illumination of two indicators can indicate/convey an in between amount of energy usage (e.g., that the mid save energy mode is selected).

Example panel 920 can be used to control and display output indications for three monitored areas. Example panel 920 includes three mode selection sensing inputs represented by switches 927, 928, 929 that when actuated can be used to select or cycle through operating modes for activation. Example mode selection switch 929 may be used to select or cycle through operating modes for activation for a first monitored area. Example mode selection switch 928 may be used to select or cycle through operating modes for activation for a second monitored area. Example mode selection switch 927 may be used to select or cycle through operating modes for activation for a third monitored area. Example panel 920 also includes output indicators 923, 926 which can provide a graphical indication of the operating mode for the first monitored area, output indicators 922, 925 which can provide a graphical indication of the operating mode for the second monitored area, and output indicators 921, 924 which can provide a graphical indication of the operating mode for the third monitored area.

Example panel 930 can be used to control and display output indications for a plurality of monitored areas. Example panel 930 includes a plurality of mode selection sensing inputs represented by switches, two of which (mode selection switches 931, 932) are labeled and illustrated. The mode selection switches when actuated can be used to select or cycle through operating modes for activation. Each of the example mode selection switches may be used to select or cycle through a comfort energy mode, a mid save energy mode, and a max save energy mode. Example panel 930 also includes a plurality of output indicators, three for each area (output indicators 933, 934, 935, 936, 937, 938 are illustrated), which can provide a graphical indication of the operating mode for the monitored areas. Example output indicators 934, 936, 938 can provide a graphical indication of the operating mode for the first monitored area, and can also provide a graphical measurement of that operating mode's energy usage relative to that of each of the other operating modes (when instead displayed) for that area (described for example panel 910 and FIG. 5). Example output indicators 933, 935, 937 can provide a graphical indication of the operating mode for the second monitored area, and can also provide a graphical measurement of that operating mode's energy usage relative to that of each of the other operating modes (when instead displayed) for that area (described for example panel 910 and FIG. 5).

Example panel 940 can be used to control and display output indications for a plurality of monitored areas. Example panel 940 includes a plurality of mode selection sensing inputs represented by switches, two of which (mode selection switches 950, 951) are labeled and illustrated. The mode selection switches when actuated can be used to select or cycle through operating modes for activation. Each of the example mode selection switches may be used to select or cycle through four different energy modes.

Example panel 940 also includes a plurality of output indicators, four for each area (output indicators 942, 943, 944, 945, 946, 947, 948, 949 are illustrated), which can provide a graphical indication of the operating mode for the monitored areas. Example output indicators 942, 943, 944, 945 can provide a graphical indication of the operating mode for a first monitored area and example output indicators 946, 947, 948, 949 can provide a graphical indication of the operating mode for a second monitored area. Each of the output indicators in this example are in a different shape. A particular shape in this example is associated with a particular operating mode and monitored area. The illumination of a particular shape in this example indicates a selected operating mode for a monitored area. In other examples, each operating mode may have a distinct shape. For example, an output indicator for a first mode may be in the shape of a circle, an output indicator for a second mode may be in the shape of a square, and an output indicator for a third mode may be in the shape of a triangle. Thus, the location of an illuminated shape on a display panel may indicate the monitored area and the type of shape illuminated shape may indicate the selected mode type.

As described earlier, switches such as switches 916, 927, 928, 929, 931, 932, 950, 951 can represent sensing inputs such as (e.g., panel-mounted) push button switches, or other types of sensing inputs for sensing user input such as touch sensors that may be included as part of a touch-screen Graphical User Interface such as may be included in a smart phone or other mobile device that senses user input by, for example, sensing the touch of a finger.

Figure 10:
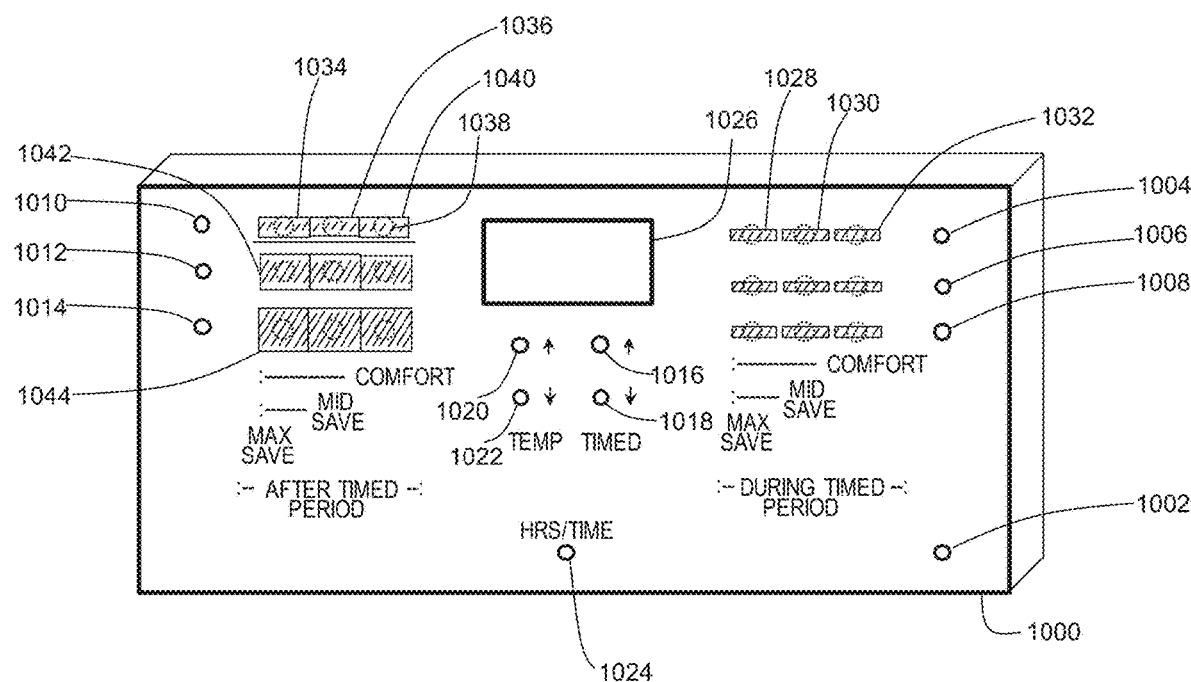
FIG. 10 is a diagram depicting an example user interface device in the form of a control panel that can be used by a user to input mode changes and operating parameter changes for a plurality of monitored areas.

FIG. 10 is a diagram depicting an example user interface device 1000 in the form of a control panel that can be used by a user to input mode changes and operating parameter changes for a plurality of monitored areas. The example user interface device 1000 includes a user input section and an output indication section. The example user input section includes a simple touch operation sensing input exemplified by simple touch operation switch 1002, three timed period energy mode selection switches 1004, 1006, 1008, three untimed period energy mode selection switches 1010, 1012, 1014, an increment timed period adjustment switch 1016, a decrement timed period adjustment switch 1018, an increment set-point temperature adjustment switch 1020, a decrement set-point temperature adjustment switch 1022, and a timed period type/scale adjustment switch 1024. The example output indication section includes a display panel 1026, three energy mode selection indicators for each of a first monitored area, a second monitored area, and a third monitored area for a timed period (selection indicators 1028, 1030, 1032 for a first monitored area are labeled), and three energy mode selection indicators for each of the first monitored area, the second monitored area, and the third monitored area for an untimed period (selection indicators 1034, 1036, 1038 for a first area are labeled).

The example user interface device 1000 can receive user input information such as desired operating parameters for environmental adjustment equipment via the user input section and display output indication information regarding operating parameters for the environmental adjustment equipment via the output indication section. The example user interface device 1000 can receive user input information for three different monitored areas and display output indication information for the three monitored areas. The example user interface device 1000 may operate in a manner like that of example user interface device 500 and do so in regards to three different monitored areas.

The example user interface device 1000 illustrates that the energy mode selection indicators can be arranged in the shape of a slot and the width (e.g., distance from top to bottom) of the slots for a monitored area may be used to indicate the monitored area to which the slots relate. As an example, the output indicators that make up a first slot 1040 have a first width, the output indicators that make up a second slot 1042 have a width that is wider than the output indicators that make up the first slot 1040, and the output indicators that make up a third slot 1044 have a width that is wider than the output indicators that make up the first slot 1040 and the second slot 1042. Also, the number of output indicators illuminated may indicate a selected energy mode.

The example different width sizes of the slots shown serves as only one example of how visual indication of any operating mode selected for one area can be made to appear distinguishably different from the visual indication of any operating mode selected for another area, such that the associated area corresponding to each selected operating mode is immediately apparent for example, without resorting to labels or relative location of the illuminated slots. This is particularly advantageous when viewing from farther than normal thermostat adjusting distances.

Other examples of characteristics that can distinguish output indications of all operating modes of one area from those of the other areas can be, for example, if one area's indications were provided using illuminated round holes, a second area's using square holes, and a third area's using triangular holes. Area-distinguishing color is another example of what can also be used, for example, where one area's operating mode indications are observed as one color (e.g., red), a second area's operating mode indications are observed as a second color (e.g., orange), and a third area's operating mode indications observed as a third color (e.g., green).

The example user interface device 1000 can respond in similar fashion to a request to begin a STO sequence described for FIG. 5 in response to, for example, actuation of STO switch 502, but in this example, in response to, for example, actuation of switch 1002 applies to all areas monitored and therefore can result in an operating mode for each area of a timed period, and an operating mode for each area of an untimed period to be displayed as selected as described earlier. The current example user interface device 1000 has the timed period of an STO sequence apply to all areas such that during the timed period all operating modes selected for use during the timed period are in use (in the activated state) for their respective areas, and at expiration of the timed period, all operating modes (e.g., prior) selected for use during the untimed period (i.e., shown as the "after timed period") become in use instead of the operating modes that were in use during the timed period. Some systems can allow more than one timed period such as for use in a STO sequence where, for example, a different length time period could be programmed for each area where, for example, timed period operation begins at the same time for all timed periods, but they may expire at different points in time causing the timed and untimed operating modes only of the area associated with that timed period to be affected by its expiration. Though FIG. 10 illustrates an interface device supporting three areas, other interface devices can support more or less than that number of areas.

As described earlier, switches such as switches 1002-1024 can represent sensing inputs such as (e.g., panel-mounted) push button switches, or other types of sensing inputs such as touch sensors that may be included as part of a touchscreen Graphical User Interface such as may be included in a smart phone or other mobile device that sense user input by, for example, sensing the touch of a finger.

Figure 11:
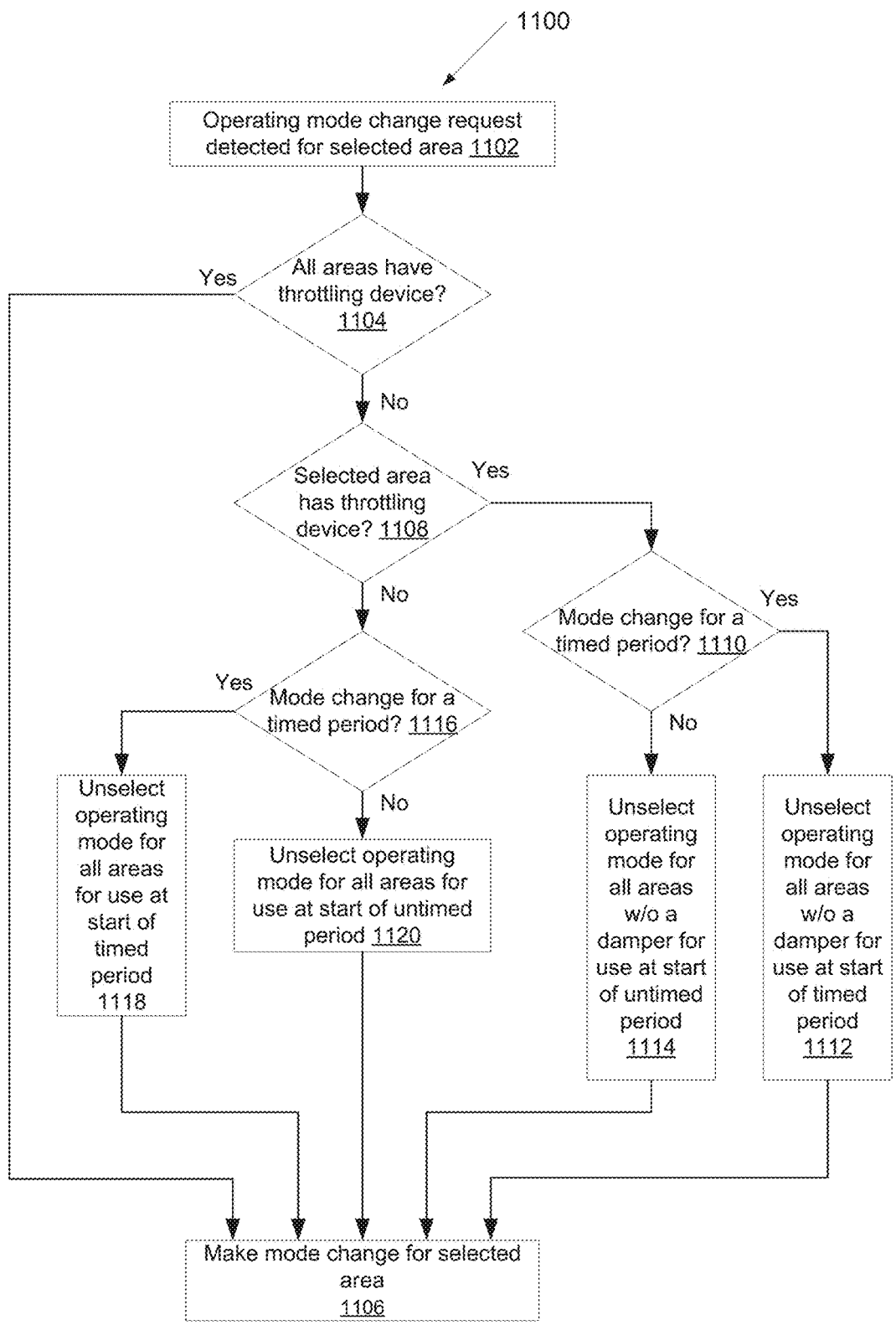
FIG. 11 is a process flow chart depicting an example process in an example control system having a plurality of user interface devices (e.g., control panels) for providing command information to environmental adjustment equipment.

FIG. 11 is a process flow chart depicting an example process 1100 in an example control system having a plurality of user interface devices (e.g., control panels) for providing command information to environmental adjustment equipment. The example process 1100 includes detecting an operating mode change request at any user interface device located in any monitored area (operation 1102) to select for use any one particular operating mode for any area, such as by an actuation of any of the three timed period energy mode selection switches 1004, 1006, 1008, three untimed period energy mode selection switches 1010, 1012, 1014, or in response to the expiration of a timed period. When for each monitored area the environmental adjustment equipment includes a throttling device for controlling the flow of conditioned medium provided to the monitored area (yes, at decision 1104), the operating mode change request is executed (operation 1106).

When the environmental adjustment equipment does not include a throttling device for controlling the flow of conditioned medium to all monitored areas (no at decision 1104) and the environmental adjustment equipment does include a throttling device for controlling the flow of conditioned medium to the monitored area of the particular operating mode requested to be selected (yes at decision 1108), and the operating mode change request is for use during a timed period (yes at decision 1110), all selected operating modes for use during the timed period for the monitored areas for which the environmental adjustment equipment does not include a throttling device for controlling the flow of conditioned medium to the monitored area are to be unselected (operation 1112) and the operating mode change request is executed (operation 1106).

When the environmental adjustment equipment does not include a throttling device for controlling the flow of conditioned medium to all monitored areas (no at decision 1104) and the environmental adjustment equipment does include a throttling device for controlling the flow of conditioned medium to the monitored area of the particular operating mode requested to be selected (yes at decision 1108), and the operating mode change request is for use during an untimed period (no at decision 1110), all selected operating modes for use during the untimed period for the monitored areas for which the environmental adjustment equipment does not include a throttling device for controlling the flow of conditioned medium to the monitored area are to be unselected (operation 1114) and the operating mode change request is executed (operation 1106).

When the environmental adjustment equipment does not include a throttling device for controlling the flow of conditioned medium to all monitored areas (no at decision 1104) and the environmental adjustment equipment does not include a throttling device for controlling the flow of conditioned medium to the monitored area of the particular operating mode requested to be selected (no at decision 1108), and the operating mode change request is for use during a timed period (yes at decision 1116), all selected operating modes for use during the timed period for all monitored areas are to be unselected (operation 1118) and the mode change request is executed (operation 1106).

When the environmental adjustment equipment does not include a throttling device for controlling the flow of conditioned medium to all monitored areas (no at decision 1104) and the environmental adjustment equipment does not include a throttling device for controlling the flow of conditioned medium to the monitored area of the particular operating mode requested to be selected (no at decision 1108), and the operating mode change request is for use during an untimed period (no at decision 1116), all selected operating modes for use during the untimed period for all monitored areas are to be unselected (operation 1120) and the mode change request is executed (operation 1106). "Deactivating" an operating mode of a particular associated area can generally be viewed as temporarily (i.e., just for the duration of the current timed or untimed period) or "permanently" (i.e., until the operating mode is again selected) considering it as unselected such that during the time of being considered unselected its output indication will normally not be asserted (e.g., not energized/illuminated) and an area temperature regulator (e.g., area temperature regulator 118) that transfers HVAC command information to environmental adjustment equipment to regulate system area temperatures, will normally no longer respond to temperature information indicating a request for the area to receive conditioned medium, based on comparing the area's temperature with the set point associated with (i.e., used for) the deactivated operating mode at the time the comparison was performed.

Operation 1106 can execute in response to requests from prior operations to select for use the particular operating mode requested to be selected, and to unselect any currently selected operating mode for (i.e., associated with) any area identified by the prior operations as needing to have its associated operating modes unselected. After doing so, in some cases there may be one or more areas where each has no selected operating mode. This can occur where for example, environmental adjustment equipment does not include a throttling device for the area, and an operating mode for a different area is selected for use. In this case the area for which there is no throttling device (e.g., damper) can continue to receive conditioned medium (e.g., heated or cooled air) regardless of how much it raises or lowers its temperature due to the area having the selected operating mode needing more conditioned medium. With the loss of temperature regulation for that area, an operating mode associated with it is not shown as selected which would indicate that when in use the area is temperature regulated based on a set point associated with the operating mode's category (e.g., comfort, mid save, or max save).

Use of example process 1100 in a HVAC control system allows a user to incrementally add throttling devices for example, as finances allow, and as added have the system respond automatically adapt (i.e., automatic adaptation) as, for example, dampers are added to the system. Output indication information such as shown in FIG. 1 can be updated based on example process 1100, and as needed based on results of other processes and operations shown and/or described herein, and transferred to one or more output indication sections for observable display.

Various example descriptions herein of user-observable output indications such as user-observable displays of, for example, which operating (e.g., energy) modes are selected, or those that include a graphical measurement of energy usage for each of one or more operating modes, can refer to illuminated or energized areas and/or output indicators such as slots, cutouts, various shapes, LEDs and other displays. These example descriptions are not intended to limit user-observable output indications to only those types that use elements of the display that are brighter (i.e., of greater illumination) than their surrounding area such as energized LEDs, segments of an LED display, slots emanating light transferred through the slot from an LED beneath it, and elements of some LCD displays that are designed to display and convey the elements of interest (e.g., characters, numbers, symbols, pictures, images, etc.) as brighter than their surroundings. The spirit and scope of the examples and descriptions herein of apparatus, systems, techniques and articles includes being able to provide user-observable output indications on or with devices such as some types of LCD and other technology displays that are designed to display and convey the elements of interest (e.g., characters, numbers, symbols, pictures, images, etc.) as less bright (i.e., darker) than their surroundings. Many common LCD displays are examples of this type of display that show, for example, letters, numbers, and characters as darker (e.g., dark grey or black) images on a lighter background (e.g., light grey or even illuminated).

Described herein are apparatus, systems, techniques and articles for controlling environmental adjustment equipment. The described apparatus, systems, techniques and articles allow for simple touch (e.g., one touch) control of certain operating modes. The described apparatus, systems, techniques and articles allow for controlling the flow of conditioned medium using energy modes.

In one embodiment, an interface control device in a control system configured to provide command information to environmental adjustment equipment is provided. The interface control device comprises an input section configured to sense user input and provide input information based on the sensed user input, an output indication section configured to display output indication information, one or more processors configured to receive the input information from the input section and provide the output indication information to the output indication sections, and non-transient computer readable media coupled to the one or more processors wherein the non-transient computer readable media embodies programming instructions configurable to cause the one or more processors to perform a method. The method comprises receiving user input via the input section and simultaneously displaying via the output indication sections an operating mode selection for use during a timed period, an operating mode selection for use during an untimed period, and a predetermined timed period length in the form of a duration or an ending clock time. The method further comprises providing instructions to a controller that instructs the environmental adjustment equipment to operate in a manner consistent with the operating mode selections for the timed period and the untimed period and the predetermined timed period.

These aspects and other embodiments may include one or more of the following features. The output indication section may comprise a plurality of output indicators for indicating a selected operating mode and an amount of user-observable illuminated area from the output indicators may indicate the selected operating mode. The output indication section may comprise a plurality of output indicators for indicating a selected operating mode and the number of illuminated output indicators may indicate the selected operating mode. The output indication section may comprise a plurality of output indicators for indicating a selected operating mode and the color of illuminated output indicators may indicate the selected operating mode. The output indication section may comprise a plurality of output indicators for indicating a selected operating mode and the shape of illuminated output indicators may indicate the selected operating mode. The selected operating mode for use during the timed period may be the same as the selected operating mode for use after the timed period and may have a set-point temperature that is different from the set-point temperature for the selected operating mode for use after the timed period. Displaying via an output indication section in the interface control device an operating mode selection may comprise displaying via the output indication section a graphical measurement showing the amount of energy usage of its associated operating mode relative to energy usage for a different operating mode. The method may further comprise retrieving parameters for a predetermined operating mode for use during a timed period and providing instructions to a controller that instructs the environmental adjustment equipment to operate may comprise providing instructions to a controller that instructs the environmental adjustment equipment to operate in a manner consistent with the parameters for the predetermined operating mode. The method may further comprise retrieving parameters for a second predetermined operating mode for use after the timed period and providing instructions to a controller that instructs the environmental adjustment equipment to operate may further comprise providing instructions to a controller that instructs the environmental adjustment equipment to operate in a manner consistent with the parameters for the second predetermined operating mode. The method may further comprise retrieving a predetermined timed period duration for use during a timed period and providing instructions to a controller that instructs the environmental adjustment equipment to operate may comprise providing instructions to a controller that instructs the environmental adjustment equipment to operate in a manner consistent with the predetermined timed period duration. The input section may comprise a first switch, retrieving parameters for a predetermined operating mode for use during a timed period may comprise retrieving parameters for a predetermined operating mode for use during a timed period responsive to actuation of the first switch, and retrieving parameters for a second predetermined operating mode for use after the timed period may comprise retrieving parameters for a second predetermined operating mode for use after the timed period responsive to actuation of the first switch. The input section may further comprise a second switch and the interface control device may be configured to select for use during the timed period a different operating mode when the second switch is actuated following the actuation of the first switch. The input section may further comprise a third switch and the interface control device may be configured to select for use during the untimed period a different operating mode when the third switch is actuated following the actuation of the first switch. Providing instructions to a controller may comprise providing instructions to a controller that instructs the environmental adjustment equipment to operate in a manner consistent with predetermined operating parameters for the timed period when operating parameter changes have not been entered and operate for an untimed period in a manner consistent with the operating parameters in use prior to entering the timed period.

In another embodiment, a method in an interface control device for a control system that provides control instruction to environmental adjustment equipment is provided. The method comprises receiving user input via an input section in the interface control device and simultaneously displaying via an output indication section in the interface control device an operating mode selection for use during a timed period, an operating mode selection for use during an untimed period, and a predetermined timed period length in the form of a duration or an ending clock time. The method further comprises providing instructions to a controller that instructs the environmental adjustment equipment to operate in a manner consistent with the operating mode selections for the timed period and the untimed period and the predetermined timed period.

These aspects and other embodiments may include one or more of the following features. The output indication section may comprise a plurality of output indicators for indicating a selected operating mode and an amount of user-observable illuminated area from the output indicators may indicate the selected operating mode. The output indication section may comprise a plurality of output indicators for indicating a selected operating mode and the number of illuminated output indicators may indicate the selected operating mode. The output indication section may comprise a plurality of output indicators for indicating a selected operating mode and the color of illuminated output indicators may indicate the selected operating mode. The output indication section may comprise a plurality of output indicators for indicating a selected operating mode and the shape of illuminated output indicators may indicate the selected operating mode. The selected operating mode for use during the timed period may be the same as the selected operating mode for use after the timed period and may have a set-point temperature that is different from the set-point temperature for the selected operating mode for use after the timed period. Displaying via an output indication section in the interface control device an operating mode selection may comprise displaying via the output indication section a graphical measurement showing the amount of energy usage of its associated operating mode relative to energy usage for a different operating mode. The method may further comprise retrieving a predetermined timed period duration for use during a timed period and providing instructions to a controller that instructs the environmental adjustment equipment to operate may comprise providing instructions to a controller that instructs the environmental adjustment equipment to operate in a manner consistent with the predetermined timed period duration. The method may further comprise retrieving parameters for a predetermined operating mode for use during a timed period and providing instructions to a controller that instructs the environmental adjustment equipment to operate may comprise providing instructions to a controller that instructs the environmental adjustment equipment to operate in a manner consistent with the parameters for the predetermined operating mode. The method may further comprise retrieving parameters for a second predetermined operating mode for use after the timed period and providing instructions to a controller that instructs the environmental adjustment equipment to operate further may comprise providing instructions to a controller that instructs the environmental adjustment equipment to operate in a manner consistent with the parameters for the second predetermined operating mode. The input section may comprise a first switch, retrieving parameters for a predetermined operating mode for use during a timed period may comprise retrieving parameters for a predetermined operating mode for use during a timed period responsive to actuation of the first switch, and retrieving parameters for a second predetermined operating mode for use after the timed period may comprise retrieving parameters for a second predetermined operating mode for use after the timed period responsive to actuation of the first switch. The input section may further comprise a second switch and the method may further comprise selecting for use during the timed period a different operating mode when the second switch is actuated following the actuation of the first switch. The input section may further comprise a third switch and the method may further comprise selecting for use during the untimed period a different operating mode when the third switch is actuated following the actuation of the first switch. Providing instructions to a controller may comprise providing instructions to a controller that instructs the environmental adjustment equipment to operate in a manner consistent with predetermined operating parameters for the timed period when operating parameter changes have not been entered and operate for an untimed period in a manner consistent with the operating parameters in use prior to entering the timed period.

In another embodiment, a method in an interface control device for a control system that provides control instruction to environmental adjustment equipment is provided. The method comprises receiving via an input section on the interface control device an indication to change to a mode of operating comprising a timed period and an untimed period when a first switch is actuated, retrieving predetermined parameters for the mode of operating, displaying via an output indication section on the interface control device predetermined parameters for both the timed period and the untimed period, and providing instructions for commanding the environmental adjustment equipment to operate in a manner consistent with the predetermined parameters for both the timed period and the untimed period when operating parameter changes have not been entered.

Theses aspects and other embodiments may include one or more of the following features. The predetermined parameters may comprise the last used parameters for the mode of operating.

In another embodiment, an interface control device in a control system configured to provide command information to environmental adjustment equipment is provided. The interface control device comprises an input section configured to sense user input and provide input information based on the sensed user input, an output indication section configured to display output indication information, one or more processors configured to receive the input information from the input section and provide the output indication information to the output indication sections, and non-transient computer readable media coupled to the one or more processors. The non-transient computer readable media embodies programming instructions configurable to cause the one or more processors to perform a method. The method comprises receiving via the input section an indication to change to a different operating mode, retrieving the last used operating parameters for the operating mode, displaying via the output indication sections the last used operating parameters for the operating mode, detecting whether operating parameter changes have been entered via the input section within a predetermined period of time, providing instructions for commanding the environmental adjustment equipment to operate in a manner consistent with the last used operating parameters when operating parameter changes have not been entered, updating the last used operating parameters with the changed operating parameter changes when operating parameter changes have been entered, saving the updated operating parameters, and providing instructions for commanding the environmental adjustment equipment to operate in a manner consistent with the updated operating parameters.

These aspects and other embodiments may include one or more of the following features. The input section may comprise a simple touch operation touch sensing input such as a switch that when actuated is configured to cause the interface control device to retrieve the last used operating parameters for a simple touch operating sequence comprising a timed period and an untimed period, display via the output indication section the last used operating parameters for both the timed period and the untimed period for the simple touch operating sequence, and provide instructions for commanding the environmental adjustment equipment to operate in a manner consistent with the last used operating parameters when operating parameter changes have not been entered. The input section may further comprise a timed period energy mode selection switch that when actuated following the actuation of the simple touch operation touch sensing input (e.g., switch) is configured to cause the interface control device to switch operation to a different power save mode option during the timed period. The input section may further comprise an untimed period energy mode selection switch that when actuated following the actuation of the simple touch operation touch sensing input is configured to cause the interface control device to switch operation to a different power save mode option during the untimed period. The input section may comprise a timed period energy mode selection switch that when actuated not following the actuation of the simple touch operation touch switch is configured to cause the interface control device to retrieve the last used operating parameters for a timed period, display via the output indication section the last used operating parameters for the timed period, provide instructions for commanding the environmental adjustment equipment to operate in a manner consistent with the last used operating parameters for the timed period when operating parameter changes have not been entered, and provide instructions for commanding the environmental adjustment equipment to operate for an untimed period following the timed period in a manner consistent with the operating parameters in use prior to entering the timed period. The interface control device may be configured to switch operation to a different power save mode option during the timed period after further actuation of the timed period energy mode selection switch. The input section may further comprise an untimed period energy mode selection switch that when actuated not following the actuation of the simple touch operation sensing input is configured to cause the interface control device to switch operation to a different power save mode option during an untimed period.

The output indication section may comprise a plurality of energy mode selection indicators including a first energy mode selection indicator for a timed period, a second energy mode selection indicator for a timed period, a third energy mode selection indicator for a timed period, a first energy mode selection indicator for an untimed period, a second energy mode selection indicator for an untimed period, and a third energy mode selection indicator for an untimed period and displaying via the output indication section the last used operating parameters for the operating mode may comprise illuminating one or more of the energy mode selection indicators corresponding to the last used operating parameters for the operating mode. The output indication section may comprise a first illumination area for providing a graphical indication of a first energy mode selection and a second illumination area for providing a graphical indication of a second energy mode selection wherein each of the first illumination area and the second illumination area includes a first subsection area, a second subsection area, and a third subsection area. The graphical indication of a first energy mode may comprise the illumination of the first subsection area, the graphical indication of a second energy mode may comprise the illumination of the first subsection area and the second subsection area, and the graphical indication of a third energy mode may comprise the illumination of the first subsection area, the second subsection area, and the third subsection area. The first, second, and third subsection areas in each of the first illumination area and the second illumination area may be positioned in the shape of a bar graph and the amount of the illuminated portion of the bar graph may indicate the energy mode selection. The number of illuminated subsection areas may indicate the energy mode selection. The graphical indication of a first energy mode may comprise the illumination of one or more subsection areas in a first color, the graphical indication of a second energy mode may comprise the illumination of one or more subsection areas in a second color, and the graphical indication of a third energy mode may comprise the illumination of one or more subsection areas in a third color. The first, second, and third subsection areas in each of the first illumination area and the second illumination area may be positioned in a proximate relationship in a shape and the amount of the illuminated portion of the shape may indicate the energy mode selection. Each first subsection area may be arranged in a first shape, each second subsection area may be arranged in a second shape, and each third subsection area may be arranged in a third shape and the graphical indication of a first energy mode may comprise the illumination of the first shape, the graphical indication of a second energy may comprise the illumination of the second shape, and the graphical indication of a third energy mode may comprise the illumination of the third shape.

In another embodiment, a method in an interface control device for a control system that provides control instruction to environmental adjustment equipment is provided. The method comprises receiving via an input section on the interface control device an indication to change to a different operating mode, retrieving the last used operating parameters for the operating mode, displaying via an output indication section on the interface control device the last used operating parameters for the operating mode, detecting whether operating parameter changes have been entered via the input section within a predetermined period of time, providing instructions for commanding the environmental adjustment equipment to operate in a manner consistent with the last used operating parameters when operating parameter changes have not been entered, updating the last used operating parameters with the changed operating parameter changes, saving the updated operating parameters, and providing instructions for commanding the environmental adjustment equipment to operate in a manner consistent with the updated operating parameters when operating parameter changes have been entered.

These aspects and other embodiments may include one or more of the following features. The retrieving, displaying and providing may comprise retrieving the last used operating parameters for a simple touch operating sequence comprising a timed period and an untimed period when a simple touch operation sensing input is actuated, displaying via the output indication section the last used operating parameters for both the timed period and the untimed period for the simple touch operating sequence, and providing instructions for commanding the environmental adjustment equipment to operate in a manner consistent with the last used operating parameters when operating parameter changes have not been entered. The retrieving, displaying and providing may comprise retrieving the last used operating parameters for a timed period, displaying via the output indication section the last used operating parameters for the timed period, providing instructions for commanding the environmental adjustment equipment to operate in a manner consistent with the last used operating parameters for the timed period when operating parameter changes have not been entered, and providing instructions for commanding the environmental adjustment equipment to operate for an untimed period following the timed period in a manner consistent with the operating parameters in use prior to entering the timed period.

In another embodiment, a method in an interface control device for a control system that provides control instruction to environmental adjustment equipment is provided. The method comprises receiving via an input section on the interface control device an indication to change to a simple touch operating sequence comprising a timed period and an untimed period when a simple touch operation sensing input (e.g., switch) is actuated, retrieving the last used operating parameters for the simple touch operating sequence, displaying via an output indication section on the interface control device the last used operating parameters for both the timed period and the untimed period for the simple touch operating sequence, and providing instructions for commanding the environmental adjustment equipment to operate in a manner consistent with the last used operating parameters for both the timed period and the untimed period for the simple touch operating sequence when operating parameter changes have not been entered.

These aspects and other embodiments may include one or more of the following features. The method may further comprise updating the last used operating parameters with the changed operating parameter changes, saving the updated operating parameters, and providing instructions for commanding the environmental adjustment equipment to operate in a manner consistent with the updated operating parameters when operating parameter changes have been entered.

In another embodiment, a control system for providing command information to environmental adjustment equipment is provided. The control system comprises a user interface device having a user input section configured to sense user input and provide user input information based on the sensed user input and an output indication section configured to display output indication information. The control system further comprises a controller configured to receive the user input information, provide the output indication information, and issue command information to the environmental adjustment equipment based on the user input information wherein the controller comprises one or more processors and non-transient computer readable media coupled to the one or more processors. The non-transient computer readable media embodies programming instructions configurable to perform a method. The method comprises receiving a first energy mode selection for a timed period and a second energy mode selection for an untimed period wherein each of the first energy mode selection and the second energy mode selection is selected from at least three different energy mode selection options, simultaneously displaying a graphical indication of the first energy mode selection and a graphical indication of the second energy mode selection on the user interface device, and providing command information to environmental adjustment equipment to operate the environmental adjustment equipment in a manner consistent with the first energy mode selection during the timed period and the second energy mode selection after the expiration of the timed period.

These aspects and other embodiments may include one or more of the following features. Each of the at least three different energy mode selection options for the first energy mode selection may have a set-point temperature and each set-point temperature may be different from the other set-point temperatures. Each of the at least three different energy mode selection options for the second energy mode selection may have a set-point temperature and each set-point temperature may be different from the other set-point temperatures. The set-point temperature for at least one of the energy mode selection options for the first energy mode selection may be different from each of the set-point temperatures for the energy mode selection options for the second energy mode selection. The set-point temperatures for each of the at least three energy mode selection options for the first energy mode selection and the at least three energy mode selection options for the second energy mode selection can be selected to have different values. The at least three energy mode selection options for the first energy mode selection may comprise a maximum energy saving mode, a middle energy saving mode, and a comfort mode. The at least three energy mode selection options for the second energy mode selection may comprise a maximum energy saving mode, a middle energy saving mode, and a comfort mode. The control system may further comprise the maximum energy saving mode for the first energy mode selection having a set-point temperature that is different from a set-point temperature for the maximum energy saving mode for the second energy mode selection. The control system may further comprise the middle energy saving mode for the first energy mode selection having a set-point temperature that is different from a set-point temperature for the middle energy saving mode for the second energy mode selection. The control system may further comprise the comfort mode for the first energy mode selection having a set-point temperature that is different from a set-point temperature for the comfort mode for the second energy mode selection.

Receiving a first energy mode selection and a second energy mode selection may comprise displaying on the user interface device the ending time or duration for the last used timed period and the last used operating mode selection for the last used timed period. Receiving a first energy mode selection and a second energy mode selection may comprise sensing the actuation of a single switch on the user interface device, displaying on the user interface device the ending time or duration for the last used timed period and the last used energy mode selection option for the last used timed period, and selecting the displayed ending time or duration and the displayed energy mode selection option for the first energy mode selection. The method may further comprise displaying on the user interface device the currently activated energy mode as the energy mode to be used after the timed period and selecting the displayed energy mode as the energy mode to be used after the timed period. The method may further comprise displaying on the user interface device a pre-programmed energy mode selection option and selecting the displayed energy mode selection option for the second energy mode selection. Receiving a first energy mode selection and a second energy mode selection may comprise sensing the actuation of a switch on the user interface device, displaying on the user interface device a pre-programmed ending time or duration and a pre-programmed energy mode selection option, and selecting the displayed ending time or duration and the displayed energy mode selection option for the first energy mode selection. The method may further comprise displaying on the user interface device the currently activated energy mode as the energy mode to be used after the timed period and selecting the displayed energy mode as the energy mode to be used after the timed period. The method may further comprise displaying on the user interface device a pre-programmed energy mode selection option and selecting the displayed energy mode selection option for the second energy mode selection.

The sensing input (e.g., switch) may comprise a simple touch operation selection switch. The switch may comprise a timed period selection switch. The control system may further comprise a ramping period near the end of the timed period wherein the ramping period has a duration estimated to allow the environmental adjustment equipment to adjust the temperature of a monitored area from a set-point temperature associated with the first energy mode selection to a set-point temperature associated with the second energy mode selection. Selecting the displayed ending time or duration and the displayed energy mode selection option for the first energy mode selection may comprise not sensing any user input for a predetermined period of time after the actuation of the switch.

In another embodiment, a control system for providing command information to environmental adjustment equipment is provided. The control system comprises a user interface device having a user input section configured to sense user input and provide user input information based on the sensed user input and an output indication section configured to display output indication information. The control system further comprises an environmental input device configured to provide temperature information for an area of interest and a controller configured to receive the user input information and the temperature information, determine and provide the output indication information, and issue command information to the environmental adjustment equipment based on the user input information and the temperature information. The controller comprises one or more processors and non-transient computer readable media coupled to the one or more processors wherein the non-transient computer readable media embodies programming instructions configurable to perform a method. The method comprises receiving an indication to change to a different operating mode, retrieving the last used operating parameters for the mode, displaying the last used operating parameters for the mode, detecting whether operating parameter changes have been entered within a predetermined period of time, providing command information to the environmental adjustment equipment to operate the environmental adjustment equipment in a manner consistent with the last used operating parameters when operating parameter changes have not been entered, and when operating parameter changes have been entered updating the last used operating parameters with the operating parameter changes, saving the updated operating parameters, and providing command information to the environmental adjustment equipment to operate the environmental adjustment equipment in a manner consistent with the updated operating parameters.

These aspects and other embodiments may include one or more of the following features. The mode may be a simple touch operating sequence comprising a timed period followed by an untimed period. The last used operating parameters may comprise an energy mode selection for the timed period and an energy mode selection for the untimed period. The last used operating parameters may include a timed period parameter comprising an ending time or a period duration parameter. The energy mode selection for the timed period may be selectable from at least three different energy mode options. Each of the at least three different energy mode options for the timed period may have a unique set-point temperature. The energy mode selection for the untimed period may be selectable from at least three different energy mode options. Each of the at least three different energy mode options for the untimed period may have a unique set-point temperature. The unique set-point temperatures for the at least three different energy mode options for the timed period may be selected to be different from the unique set-point temperatures for the at least three different energy mode options for the untimed period. The at least three different energy mode options for the timed period may comprise a maximum energy saving mode option, a middle energy saving mode option, and a comfort mode option and the at least three different energy mode options for the untimed period may also comprise a maximum energy saving mode option, a middle energy saving mode option, and a comfort mode option. The control system may further comprise the set-point temperature for the maximum energy saving mode option for the timed period being different from the set-point temperature for the maximum energy saving mode option for the untimed period. The control system may further comprise the set-point temperature for the middle energy saving mode option for the timed period being different from the set-point temperature for the middle energy saving mode option for the untimed period. The control system may further comprise the set-point temperature for the comfort mode option for the timed period being different from the set-point temperature for the comfort mode option for the untimed period.

In another embodiment, a method in a control system is provided. The method comprises receiving a first energy mode selection for a timed period and a second energy mode selection for an untimed period wherein each of the first energy mode selection and the second energy mode selection is selected from at least three different energy mode selection options, simultaneously displaying a graphical indication of the first energy mode selection and a graphical indication of the second energy mode selection on a user interface device, and providing command information to environmental adjustment equipment to operate the environmental adjustment equipment in a manner consistent with the first energy mode selection during the timed period and the second energy mode selection after the expiration of the timed period.

These aspects and other embodiments may include one or more of the following features. Receiving a first energy mode selection and a second energy mode selection may comprise sensing the actuation of a single switch on the user interface device, displaying on the user interface device the ending time or duration for the last used timed period and the last used energy mode selection option for the last used timed period, and selecting the displayed ending time or duration and the displayed energy mode selection option for the first energy mode selection. The method may further comprise displaying on the user interface device the currently activated energy mode as the energy mode to be used after the timed period and selecting the displayed energy mode as the energy mode to be used after the timed period.

In another embodiment, a control system for providing command information to environmental adjustment equipment is provided. The control system comprises a first user interface device configured to regulate the flow of conditioned medium to a plurality of monitored areas in a building wherein the first user interface device comprises a user input section configured to sense user input identifying desired usage of the environmental adjustment equipment for the plurality of monitored areas, the first user interface device comprises an output indication section configured to display output indication information identifying selected operating parameters of the environmental adjustment equipment for the plurality of monitored areas, the output indication section comprises a plurality of output indication subsections, each of the plurality of output indication subsections correspond to a different one of the plurality of monitored areas, and each of the plurality of output indication subsections comprise a first, second, and third energy mode selection indicator for a timed period and a first, second, and third energy mode selection indicator for an untimed period. The first user interface device is configured to simultaneously display via the output indication section a graphical indication of a first energy mode selection selected for activation during a timed period for a first of the monitored areas and a graphical indication of a second energy mode selection selected for activation during the timed period for a second of the monitored areas.

These aspects and other embodiments may include one or more of the following features. The energy mode selection indicators in the output indication subsection corresponding to the first monitored area may be configured to be illuminated using a first color and the energy mode selection indicators in the output indication subsection corresponding to the second monitored area may be configured to be illuminated using a second color. The energy mode selection indicators may be arranged in the shape of a slot and the width of the slots in the output indication subsection corresponding to the first monitored area may be larger than the width of the slots in the output indication subsection corresponding to the second monitored area. Each of the energy mode selection indicators in the output indication subsection corresponding to the first monitored area may be arranged in a first shape and each of the energy mode selection indicators in the output indication subsection corresponding to the second monitored area may be arranged in a second shape.

The user input section of the first user interface device may comprise a first sensing input (e.g., switch) that when actuated selects one of a plurality of energy mode selection options as the first energy mode selection for the first monitored area and a second switch that when actuated selects one of the plurality of energy mode selection options as the second energy mode selection for the second monitored area.

The user input section of the first user interface device may comprise a first switch that when actuated selects one of a plurality of energy mode selection options as the first energy mode selection for the first monitored area for the timed period and the control system may further comprise a second user interface device configured to regulate the flow of conditioned medium to the plurality of monitored areas in a building wherein the second user interface device is located in a monitored area different from the monitored area in which the first user interface device is located, the second user interface device comprises a second user input section, and the second user input section comprises a second switch that when actuated selects one of the plurality of energy mode selection options as the first energy mode selection for the first monitored area for the timed period.

The user input section of the first user interface device may comprise a first sensing input (e.g., switch) that when actuated selects one of a plurality of energy mode selection options for activation in the first monitored area during an untimed period following the timed period and the control system may further comprise a second user interface device configured to regulate the flow of conditioned medium to the plurality of monitored areas in a building wherein the second user interface device is located in a monitored area different from the monitored area in which the first user interface device is located, the second user interface device comprises a second user input section, and the second user input section comprises a second switch that when actuated selects one of the plurality of energy mode selection options for activation in the first monitored area during the untimed period following the timed period.

The first user interface device may be further configured to simultaneously display via the output indication section a graphical indication of a third energy mode selection selected for activation during an untimed period following the timed period for the first of the monitored areas and a graphical indication of a fourth energy mode selection selected for activation during the untimed period following the timed period for the second of the monitored areas.

The first user interface device may be further configured to simultaneously display via the output indication section a graphical indication of the first energy mode selection selected for activation during the timed period for the first of the monitored areas, a graphical indication of a third energy mode selection selected for activation during an untimed period following the timed period for the first of the monitored areas, a graphical indication of the second energy mode selection selected for activation during the timed period for the second of the monitored areas, and a graphical indication of a fourth energy mode selection selected for activation during the untimed period following the timed period for the second of the monitored areas.

In another embodiment, a control system for providing command information to environmental adjustment equipment is provided. The control system comprises a plurality of user interface devices wherein each user interface device is configured to regulate the flow of conditioned medium to a plurality of monitored areas in a building and each user interface device is located in a different one of the monitored areas. The control system further comprises one or more processors associated with the plurality of user interface devices and non-transient computer readable media coupled to the one or more processors wherein the non-transient computer readable media embodies programming instructions configurable to cause the one or more processors to perform a method. The method comprises detecting a mode change request at a first user interface device for a first monitored area, changing control of the environmental adjustment equipment to the first user interface device from a different user interface device, and executing the mode change request when for each monitored area the environmental adjustment equipment includes a throttling device for controlling the flow of conditioned medium provided to the monitored area.

These aspects and other embodiments may include one or more of the following features. The method may further comprise: when the mode change request is for a timed period, deactivating for all monitored areas any selected mode for use during the timed period when the environmental adjustment equipment does not include a throttling device for controlling the flow of conditioned medium to any of the monitored areas; when the mode change request is for an untimed period, deactivating for all monitored areas any selected mode for use during the untimed period when the environmental adjustment equipment does not include a throttling device for controlling the flow of conditioned medium to any of the monitored areas; and executing the mode change request. The environmental adjustment equipment may include a throttling device for controlling the flow of conditioned medium to the first monitored area and the method may further comprise: when the mode change request is for a timed period, deactivating all selected modes for use during the timed period for the monitored areas for which the environmental adjustment equipment does not include a throttling device for controlling the flow of conditioned medium to the monitored area; when the mode change request is for an untimed period, deactivating all selected modes for use during the untimed period for the monitored areas for which the environmental adjustment equipment does not include a throttling device for controlling the flow of conditioned medium to the monitored area; and executing the mode change request.

In another embodiment, provided is a method in a control system configured to provide command information to environmental adjustment equipment wherein the control system includes a plurality of user interface devices, each user interface device is configured to regulate the flow of conditioned medium to a plurality of monitored areas in a building, and each user interface device is located in a different one of the monitored areas. The method comprises detecting a mode change request at a first user interface device for a first monitored area, changing control of the environmental adjustment equipment to the first user interface device from a different user interface device, and executing the mode change request when for each monitored area the environmental adjustment equipment includes a throttling device for controlling the flow of conditioned medium provided to the monitored area.

These aspects and other embodiments may include one or more of the following features. The method may further comprise: when the mode change request is for a timed period, deactivating for all monitored areas any selected mode for use during the timed period when the environmental adjustment equipment does not include a throttling device for controlling the flow of conditioned medium to any of the monitored areas; when the mode change request is for an untimed period, deactivating for all monitored areas any selected mode for use during the untimed period when the environmental adjustment equipment does not include a throttling device for controlling the flow of conditioned medium to any of the monitored areas; and executing the mode change request. The environmental adjustment equipment may include a throttling device for controlling the flow of conditioned medium to the first monitored area and the method may further comprise: when the mode change request is for a timed period, deactivating all selected modes for use during the timed period for the monitored areas for which the environmental adjustment equipment does not include a throttling device for controlling the flow of conditioned medium to the monitored area; when the mode change request is for an untimed period, deactivating all selected modes for use during the untimed period for the monitored areas for which the environmental adjustment equipment does not include a throttling device for controlling the flow of conditioned medium to the monitored area; and executing the mode change request.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A control system for providing command information to environmental adjustment equipment, the control system comprising:
    a plurality of user interface devices, each user interface device configured to select an operating mode for each of a plurality of monitored areas in a building, each user interface device located in a different one of the monitored areas;
    one or more processors associated with the plurality of user interface devices; and
    non-transitory computer readable media coupled to the one or more processors and embodying programming instructions configurable to cause the one or more processors to:
        detect a mode change request at a first user interface device for a first monitored area;
        execute the mode change request for the first monitored area while retaining a prior selected mode for another monitored area that was selected using a different one of the user interface devices when for each monitored area the environmental adjustment equipment includes a throttling device for controlling the flow of conditioned medium provided to the monitored area;
        when the mode change request is for a timed period, unselect for all monitored areas any prior selected mode for use during the timed period when the environmental adjustment equipment does not include a throttling device for controlling the flow of conditioned medium to the first monitored area and execute the mode change request; and
        when the mode change request is for an untimed period, unselect for all monitored areas any prior selected mode for use during the untimed period when the environmental adjustment equipment does not include a throttling device for controlling the flow of conditioned medium to the first monitored area and execute the mode change request.

2. The control system of claim 1, wherein the environmental adjustment equipment includes a throttling device for controlling the flow of conditioned medium to the first monitored area and wherein the programming instructions are further configurable to cause the one or more processors to:
    when the mode change request is for a timed period, unselect any prior selected mode for use during the timed period for each of the monitored areas for which the environmental adjustment equipment does not include a throttling device for controlling the flow of conditioned medium to the monitored area and execute the mode change request; and
    when the mode change request is for an untimed period, unselect any prior selected mode for use during the untimed period for each of the monitored areas for which the environmental adjustment equipment does not include a throttling device for controlling the flow of conditioned medium to the monitored area and execute the mode change request.

3. A method in a control system configured to provide command information to environmental adjustment equipment, the control system including a plurality of user interface devices, each user interface device configured to select an operating mode for each of a plurality of monitored areas in a building, each user interface device located in a different one of the monitored areas, the method comprising:
    detecting a mode change request at a first user interface device for a first monitored area;
    executing the mode change request for the first monitored area while retaining a prior selected mode for another monitored area that was selected using a different one of the user interface devices when for each monitored area the environmental adjustment equipment includes a throttling device for controlling the flow of conditioned medium provided to the monitored area;
    wherein when the environmental adjustment equipment includes a throttling device for controlling the flow of conditioned medium to the first monitored area, the method further comprises:
        when the mode change request is for a timed period, unselecting any prior selected mode for use during the timed period for each of the monitored areas for which the environmental adjustment equipment does not include a throttling device for controlling the flow of conditioned medium to the monitored area and executing the mode change request; and
        when the mode change request is for an untimed period, unselecting any prior selected mode for use during the untimed period for each of the monitored areas for which the environmental adjustment equipment does not include a throttling device for controlling the flow of conditioned medium to the monitored area and executing the mode change request.

4. The method of claim 3, further comprising:
    when the mode change request is for a timed period, unselecting for all monitored areas any prior selected mode for use during the timed period when the environmental adjustment equipment does not include a throttling device for controlling the flow of conditioned medium to the first monitored area and executing the mode change request; and when the mode change request is for an untimed period, unselecting for all monitored areas any prior selected mode for use during the untimed period when the environmental adjustment equipment does not include a throttling device for controlling the flow of conditioned medium to the first monitored area and executing the mode change request.

5. A control system for providing command information to environmental adjustment equipment, the control system comprising:

a plurality of user interface devices, each user interface device configured to select an operating mode for each of a plurality of monitored areas in a building, each user interface device located in a different one of the monitored areas;

one or more processors associated with the plurality of user interface devices; and non-transitory computer readable media coupled to the one or more processors and embodying programming instructions configurable to cause the one or more processors to:

detect a mode change request at a first user interface device for a first monitored area;

execute the mode change request for the first monitored area while retaining a prior selected mode for another monitored area that was selected using a different one of the user interface devices when for each monitored area the environmental adjustment equipment includes a throttling device for controlling the flow of conditioned medium provided to the monitored area; and wherein when the environmental adjustment equipment includes a throttling device for controlling the flow of conditioned medium to the first monitored area, the programming instructions are further configurable to cause the one or more processors to:

when the mode change request is for a timed period, unselect any prior selected mode for use during the timed period for each of the monitored areas for which the environmental adjustment equipment does not include a throttling device for controlling the flow of conditioned medium to the monitored area and execute the mode change request; and when the mode change request is for an untimed period, unselect any prior selected mode for use during the untimed period for each of the monitored areas for which the environmental adjustment equipment does not include a throttling device for controlling the flow of conditioned medium to the monitored area and execute the mode change request.

6. The control system of claim 5, wherein the programming instructions are further configurable to cause the one or more processors to:

when the mode change request is for a timed period, unselect for all monitored areas any prior selected mode for use during the timed period when the environmental adjustment equipment does not include a throttling device for controlling the flow of conditioned medium to the first monitored area and execute the mode change request; and when the mode change request is for an untimed period, unselect for all monitored areas any prior selected mode for use during the untimed period when the environmental adjustment equipment does not include a throttling device for controlling the flow of conditioned medium to the first monitored area and execute the mode change request.

7. The control system of claim 5, wherein unselect for a monitored area any prior selected mode comprises discontinue any current temperature regulation of the monitored area unless the monitored area is temperature regulated as a result of executing the mode change request.

8. The control system of claim 1, wherein unselect for a monitored area any prior selected mode comprises discontinue any current temperature regulation of the monitored area unless the monitored area is temperature regulated as a result of executing the mode change request.

9. The method of claim 3, wherein unselecting for a monitored area any prior selected mode comprises discontinuing any current temperature regulation of the monitored area unless the monitored area is temperature regulated as a result of executing the mode change request.

* * * * *